United States Patent
Cao

(10) Patent No.: US 9,454,046 B2
(45) Date of Patent: Sep. 27, 2016

(54) LIQUID CRYSTAL DISPLAY DEVICE AND METHOD FOR MANUFACTURING THE SAME

(71) Applicants: Shanghai Tianma Micro-Electronics Co., Ltd, Shanghai (CN); Tianma Micro-Electronics Co., Ltd., Shenzhen (CN)

(72) Inventor: Zhaokeng Cao, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 86 days.

(21) Appl. No.: 14/522,550

(22) Filed: Oct. 23, 2014

(65) Prior Publication Data

US 2015/0378220 A1 Dec. 31, 2015

(30) Foreign Application Priority Data

Jun. 27, 2014 (CN) .......................... 2014 1 0298991

(51) Int. Cl.
*G02F 1/1343* (2006.01)
*G02F 1/1337* (2006.01)
*G02F 1/1341* (2006.01)

(52) U.S. Cl.
CPC ....... *G02F 1/134309* (2013.01); *G02F 1/1341* (2013.01); *G02F 1/13439* (2013.01); *G02F 1/133788* (2013.01); *G02F 2001/134345* (2013.01)

(58) Field of Classification Search
CPC .................... G02F 1/134309; G02F 1/133788
USPC ........................................................ 349/141
See application file for complete search history.

(56) References Cited

U.S. PATENT DOCUMENTS

| | | | | |
|---|---|---|---|---|
| 2003/0081163 A1* | 5/2003 | Suzuki | .............. | G02F 1/134363 349/139 |
| 2010/0157228 A1* | 6/2010 | Sakurai | ................. | G02F 1/1337 349/141 |
| 2010/0157229 A1* | 6/2010 | Sakurai | ............. | G02F 1/134363 349/141 |
| 2010/0216365 A1* | 8/2010 | Song | ..................... | G02F 1/1303 445/25 |
| 2011/0151590 A1* | 6/2011 | Carducci | ............. | H01L 21/3105 438/4 |
| 2012/0307169 A1* | 12/2012 | Ohyama | ............ | G02B 27/2214 349/33 |
| 2013/0112978 A1* | 5/2013 | Hoka | ................ | H01L 29/41733 257/59 |
| 2013/0128201 A1* | 5/2013 | Noma | ............... | G02F 1/133753 349/123 |
| 2013/0286308 A1* | 10/2013 | Nishida | ................... | G02F 1/139 349/33 |

(Continued)

FOREIGN PATENT DOCUMENTS

CN 101750802 A 6/2010
CN 103376603 A 10/2013

*Primary Examiner* — Sang V Nguyen
(74) *Attorney, Agent, or Firm* — Alston & Bird LLP

(57) ABSTRACT

The present disclosure provides a liquid crystal panel and a method for manufacturing the same. The liquid crystal display panel includes: first and second substrates disposed opposite to each other; a liquid crystal layer including a plurality of liquid crystal molecules and disposed between the first and second substrates; first and second alignment layers disposed on the first and second substrates and facing the liquid crystal layer; and first and second electrode both disposed on the first substrate, so that an electric field is formed between the first and second electrodes when a voltage is applied to the first and second electrodes. The first electrode has a plurality of slits, each of which has an end region and a central region adjacent to the end region, and the alignment layers at the end region and the central region have different alignment directions.

14 Claims, 19 Drawing Sheets

(56) References Cited

U.S. PATENT DOCUMENTS

2013/0329148 A1* 12/2013 Kuboki ............. G02F 1/133753
                                                            349/33
2013/0342797 A1* 12/2013 Chiou ............... G02F 1/133528
                                                            349/123
2014/0192308 A1*  7/2014 Furukawa ......... G02F 1/136209
                                                            349/138

* cited by examiner

LIQUID CRYSTAL DISPLAY DEVICE AND METHOD FOR MANUFACTURING THE SAME

CROSS-REFERENCES TO RELATED APPLICATIONS

This application claims the benefit of priority to Chinese Patent Application No. 201410298991.6, filed with Chinese Patent Office on Jun. 27, 2014 and entitled "LIQUID CRYSTAL DISPLAY DEVICE AND METHOD FOR MANUFACTURING THE SAME", the content of which is incorporated herein by reference in its entirety.

TECHNICAL FIELD

The present application relates to flat panel display technologies, and in particular to a liquid crystal display device and a method for manufacturing the same.

BACKGROUND OF THE INVENTION

Due to their advantages such as light weight, thin thickness and low power consumption, flat panel displays, especially liquid crystal displays (LCDs), become more and more popular among users. The liquid crystal displays mainly include a vertical electric field mode liquid crystal display and a horizontal electric field mode liquid crystal display according to working modes of liquid crystals.

In the vertical electric field mode liquid crystal display, a liquid crystal layer is driven by an electric field substantially perpendicular to a substrate, so that light incident on the liquid crystal layer is modulated for displaying, for example, in a Twisted Nematic (TN) mode, a Multi-domain Vertical Alignment (MVA) mode and so on.

In the horizontal electric field mode liquid crystal display, a liquid crystal layer is driven by an electric field substantially parallel to a substrate, so that light incident on the liquid crystal layer is modulated for displaying, for example, in an In-Plane Switching (IPS) mode, a Fringe Field Switching (FFS) mode and so on.

In the conventional horizontal electric field mode liquid crystal display device, an electric field that is formed between pixel electrodes and a common electrode disposed on the same common substrate and is parallel to the substrate causes the rotation of liquid crystal molecules between the pixel electrodes and the common electrode within a liquid crystal cell, where slits are formed in pixel electrodes or common electrode, or both of them.

When a horizontal electric field is formed in an end region at both ends of the slit, the electric field does not have a unified direction, so that rotation directions of the liquid crystal molecules at the end region are inconsistent, as a result of such factors, displaying by the display device is uneven and light transmittance of the liquid crystal molecules is affected.

BRIEF SUMMARY OF THE INVENTION

In view of the above problems, the present disclosure provides a liquid crystal display panel and a method for manufacturing the same.

The present disclosure provides a liquid crystal display panel, including: a first substrate and a second substrate disposed opposite to each other; a liquid crystal layer including a plurality of liquid crystal molecules and disposed between the first substrate and the second substrate; an alignment layer disposed at one side of the first substrate close to the liquid crystal layer and an alignment layer disposed at one side of the second substrate close to the liquid crystal layer; and a first electrode and a second electrode both disposed on the first substrate, so that an electric field for driving liquid crystal molecules in the liquid crystal layer to rotate is formed between the first electrode and the second electrode when a voltage is applied to the first electrode and the second electrode. The first electrode has a plurality of slits, each of which has an end region and a central region adjacent to the end region, and the alignment layers at the end region and the central region have different alignment directions.

The present disclosure further provides a method for manufacturing the liquid crystal display panel, including: providing a first substrate, and forming a first electrode and a second electrode on the first substrate so that an electric field for driving liquid crystal molecules to rotate is formed between the first electrode and the second electrode when a voltage is applied to the first electrode and the second electrode, and the first electrode has a plurality of slits, each of which has an end region and a central region adjacent to the end region; providing a second substrate; disposing alignment layers on an inner surface of the first substrate and an inner surface of the second substrate that are opposite to each other; aligning the alignment layers by using a photo-alignment process so that the alignment layers at the end region and the central region have different alignment directions; arranging the first substrate and the second substrate together in alignment with each other, and disposing a liquid crystal layer having a plurality of liquid crystal molecules in a space between the first substrate and the second substrate.

In comparison with the prior art, the first electrode in the present disclosure has a plurality of slits, each of which has the end region and the central region adjacent to the end region. The alignment layers at the end region and the central region have different alignment directions so that the liquid crystal molecules at the end region are rotated in predetermined directions under the effect of the electric fields, and thus uneven displaying is avoided and transmittance of the display panel is improved.

DETAILED DESCRIPTION OF THE INVENTION

In order to make objects, features and advantages of the present disclosure more apparent, the present disclosure is further illustrated below in combination with the accompanying drawings and embodiments.

It is noted that specific details are illustrated in the description below for sake of fully understanding the present disclosure. However, the present invention can be implemented in other ways different from those illustrated in the description herein, and can be deducted similarly without departing from the essence of the present disclosure by those skilled in the art. Therefore, the present disclosure is not limited to specific embodiments disclosed below.

Figure 1A:
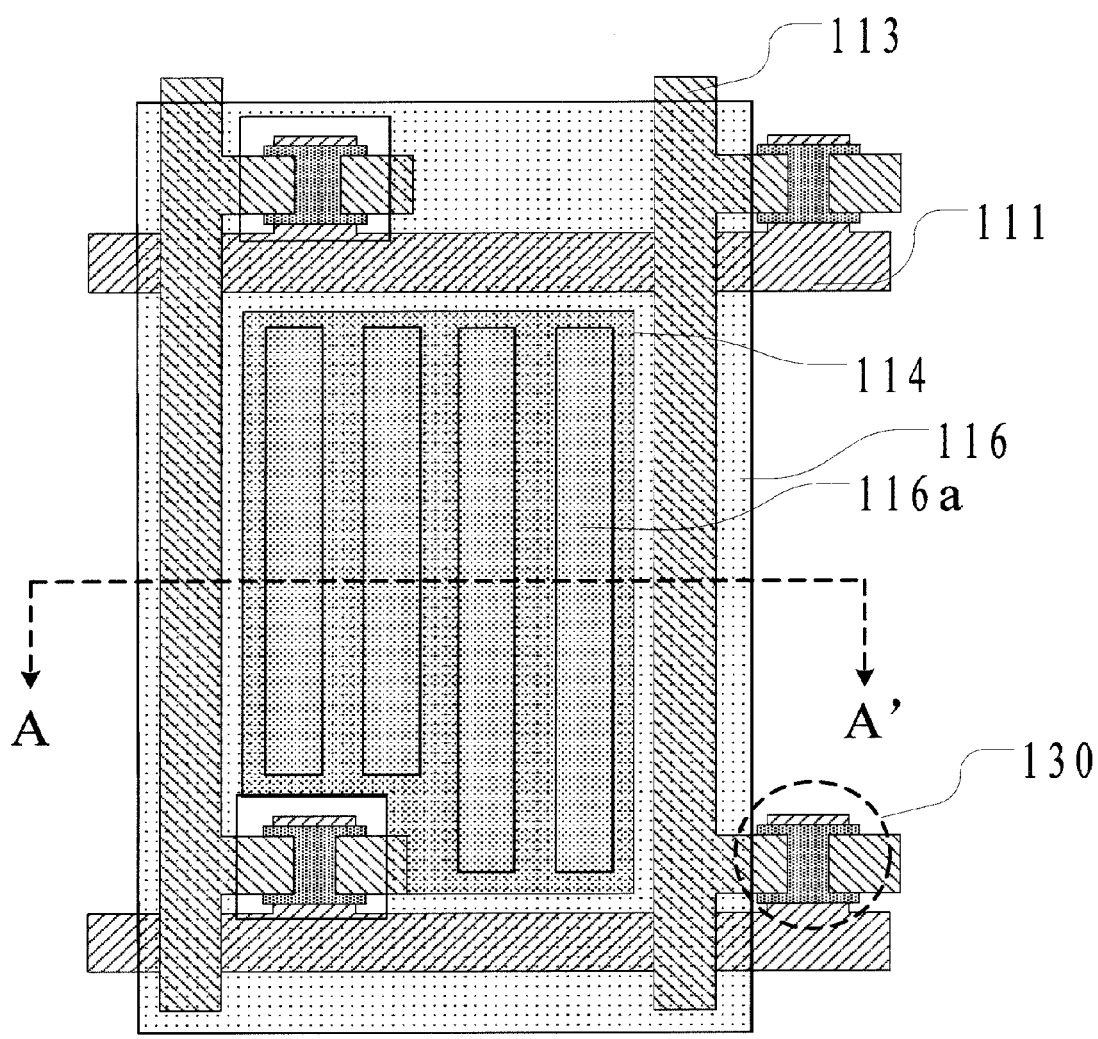
FIG. 1A is a schematic top view showing a structure of a liquid crystal display panel according to an embodiment of the present invention.
Figure 1B:
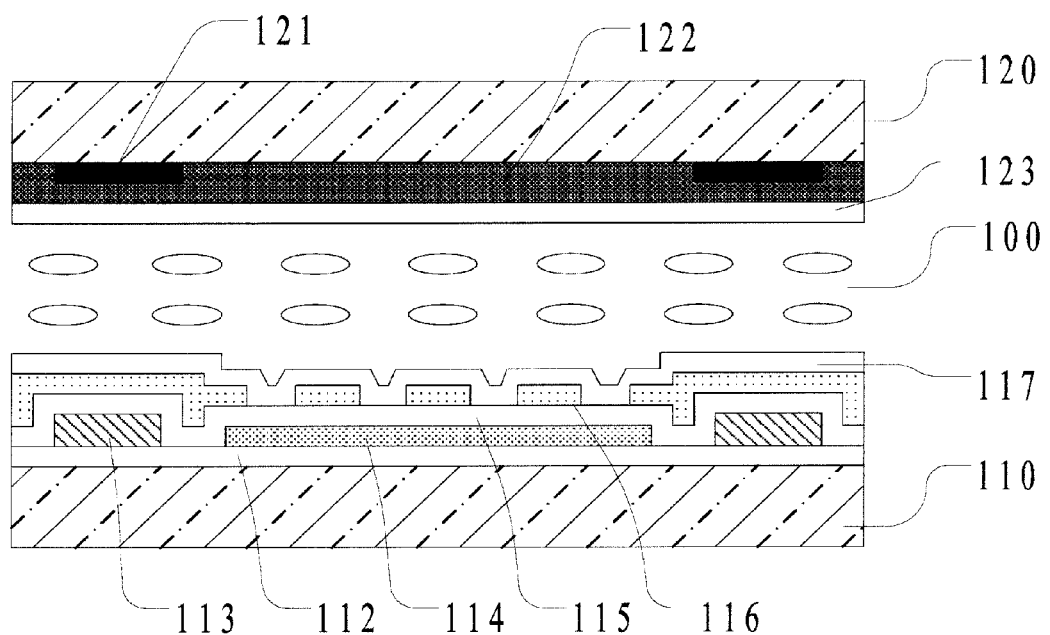
FIG. 1B is a schematic diagram showing the sectional structure taken along a line corresponding to the section AA' in FIG. 1A.

FIG. 1A is a schematic top view showing a structure of a liquid crystal display panel according to an embodiment of the present invention, and FIG. 1B is a schematic diagram showing the sectional structure taken along a line corresponding to the section AA' in FIG. 1A.

With reference to FIGS. 1A and 1B, the horizontal electric field mode liquid crystal display panel includes: a first substrate 110; a second substrate 120 disposed opposite to the first substrate 110; a liquid crystal layer 100 including a plurality of liquid crystal molecules and disposed between the first substrate 110 and the second substrate 120; an alignment layer 117 disposed at one side (the inner surface) of the first substrate 110 close to the liquid crystal layer, and an alignment layer 123 disposed at one side (the inner surface) of the second substrate 120 close to the liquid crystal layer; and a first electrode 116 and a second electrode 114 both disposed on the first substrate 110, so that an electric field for driving liquid crystal molecules to rotate may be formed between the first electrode 116 and the second electrode 114. The first electrode 116 has a plurality of slits 116a.

Specifically, a plurality of scanning lines 111 and a plurality of data lines 113 on the first substrate 110 are electrically insulated from each other by an insulation layer 112 provided between the scanning lines 111 and the data lines 113. A pixel unit is defined by a pixel region surrounded by the adjacent scanning lines 111 and the adjacent data lines 113 (one pixel unit is shown in FIG. 1A), and the pixel unit includes the first electrode 116 and the second electrode 114 disposed in a stack manner and electrically insulated from each other. The second electrode 114 has a plane shape, and the first electrode 116 includes a plurality of slits 116a. The pixel unit further includes a thin film transistor (TFT) 130 disposed at an intersection between the scanning line 111 and the data line 113, where, a gate electrode of the TFT 130 is electrically connected to the scanning line 111, a source electrode of the TFT 130 is electrically connected to the data line 113, and a drain electrode of the TFT 130 is electrically connected to the second electrode 114. An insulation layer 115 is disposed between the second electrode 114 and the first electrode 116, and the alignment layer 117 is disposed on the first electrode 116.

On the second substrate 120, there is a color filter 122 corresponding to the region provided with the pixel unit, and a shading black matrix 121 is disposed between the color filters 122. The alignment layer 123 is provided on the color filter 122 on the second substrate. In general, in order to ensure the flatness of the alignment layer, a planarization layer (not shown) is further provided between the color filter 122 and the alignment layer 123.

The first substrate 110 is disposed opposite to the second substrate 120, the liquid crystal layer 100 including a plurality of liquid crystal molecules disposed between the first and second substrates, and the alignment layer 117 on the first substrate 110 and the alignment layer 123 on the second substrate 120 are provided at the sides close to the liquid crystal layer 100.

Figure 1C:
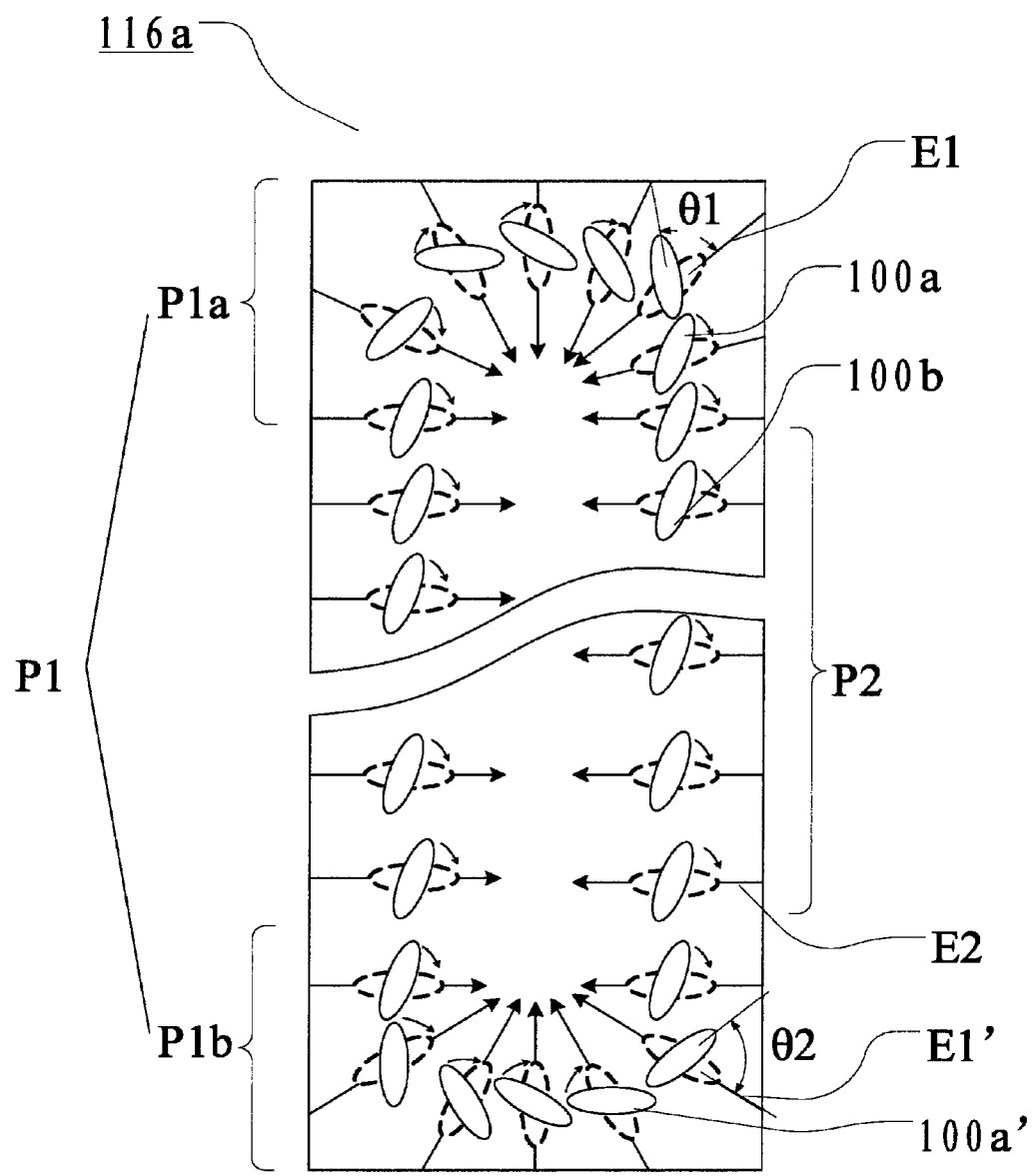
FIG. 1C is a schematic enlarged view of the slit in FIG. 1A.

FIG. 1C is a schematic enlarged view of the slit 116a in FIG. 1A. Both ends of the slit 116a form an end region P1, which includes a first end region P1a and a second end region P1b. The remaining region of the slit 116a except for the end region P1 forms a central region P2. The alignment layers at the end region P1 and the central region P2 have different alignment directions. Since the alignment layers have different alignment directions, the liquid crystal molecules 100a at the first end region P1a, the liquid crystal molecules 100a' at the second end region P1b, and the liquid crystal molecules 100b at the central region P2 have different initial alignment directions. As shown in FIG. 1C, the liquid crystal molecules indicated by solid lines are those in initial alignment directions. As can be seen from FIG. 1C, the liquid crystal molecules 100a, 100a' and 100b have different initial alignment directions.

An electric field for driving the liquid crystal molecules to rotate may be formed between the second electrode 114 and the first electrode 116. When a voltage is applied to the first electrode 116 and the second electrode 114, an electric field E1 is formed at the first end region P1a, an electric field E1' is formed at the second end region P1b, an electric field E2 is formed at the central region P2. When the liquid crystal molecules have a positive dielectric anisotropy, the alignment directions of the alignment layer at the first end region P1a are rotated in the rotation direction of the liquid crystal molecules at a region adjacent to the first end region P1a (i.e. the central region P2) by a rotation angle θ1 to be parallel to the direction of the electric field E1, where 0°<θ1<90°, so that the liquid crystal molecules 100a at the first end region P1a have a unified rotation direction under the effect of the electric field E1, and the unified rotation direction is consistent with the rotation direction of the liquid crystal molecules 100b at the central region P2. Likewise, the alignment directions of the alignment layer at the second end region P1b are rotated in the rotation direction of the liquid crystal molecules at a region adjacent to the second end region P1b (i.e. the central region P2) by a rotation angle θ2 to be parallel to the direction of the electric field E1', where 0°<θ2<90°, so that the liquid crystal molecules 100a' at the second end region P1b have a unified rotation direction under the effect of the electric field E1', and the unified rotation direction is consistent with the rotation direction of the liquid crystal molecules 100b at the central region P2. In other words, when a voltage is applied to the second electrode 114 and the first electrode 116, an electric field is formed in the slit 116a. Under the effect of the electric field E1, the liquid crystal molecules 100a at the first end region P1a rotate toward a direction parallel to the direction of the electric field E1, and the alignment directions of the alignment layer at the first end region P1a are configured in such a way that the liquid crystal molecules 100a have the same rotation direction as the liquid crystal molecules 100b at the central region under the effect of the electric field E1. Under the effect of the electric field E1', the liquid crystal molecules 100a' at the second end region P1b rotate toward a direction parallel to the direction of the electric field E1', and the alignment directions of the alignment layer at the second end region P1b are configured in such a way that the liquid crystal molecules 100a' have the same rotation direction as the liquid crystal molecules 100b at the central region under the effect of the electric field E1'.

Further, the rotation angles θ1 and θ2 satisfy the relations 45°<θ1<90° and 45°<θ2<90°, respectively. The alignment directions of the alignment layer at the first end region P1a are configured in such a way that the liquid crystal molecules 100a rotate under the effect of the electric field E1 from the respective initial alignment directions (i.e. the alignment directions of the alignment layer) by the rotation angles θ1 to a direction parallel to the direction of the electric field E1 and the rotation angles θ1 satisfy the relation 45°<θ1<90°. The alignment directions of the alignment layer at the second end region P1b are configured in such a way that the liquid crystal molecules 100a' rotate under the effect of the electric field E1' from the respective initial alignment directions (i.e. the alignment directions of the alignment layer) by the rotation angles θ2 to a direction parallel to the direction of the electric field E1' and the rotation angles θ2 satisfy 45°<θ2<90°. A reason for this is that, in the horizontal electric field mode liquid crystal display device, when an azimuthal angle of liquid crystal molecule is 45°, the liquid crystal layer has the highest light transmittance so that the display device has the highest light transmission quantity, thus if the rotation angle is larger than 45°, the liquid crystal display device can have the highest luminance in the rotation process of the liquid crystal molecules to obtain a high contrast of the liquid crystal display device.

As shown, the slit 116a is formed by a straight portion extending along a single predetermined direction. The first end region P1a and the second end region P1b are included at both ends of the straight portion, and the first end region P1a and the second end region P1b are adjacent to two ends of the central region P2, respectively. When a voltage is applied to the first electrode 116 and the second electrode 114, the liquid crystal molecules at the central region P2 have a fixed rotation direction under the effect of the electric field E2, the alignment directions of the alignment layer at the first end region P1a are configured in such a way that the liquid crystal molecules 100a at the first end region P1a are rotated in a direction consistent with the fixed rotation direction under the effect of the electric field E1, and the alignment directions of the alignment layer at the second end region P1b are configured in such a way that the liquid crystal molecules 100a' at the second end region P1b are rotated in a direction consistent with the fixed rotation direction under the effect of the electric field E1'.

Figure 1D:
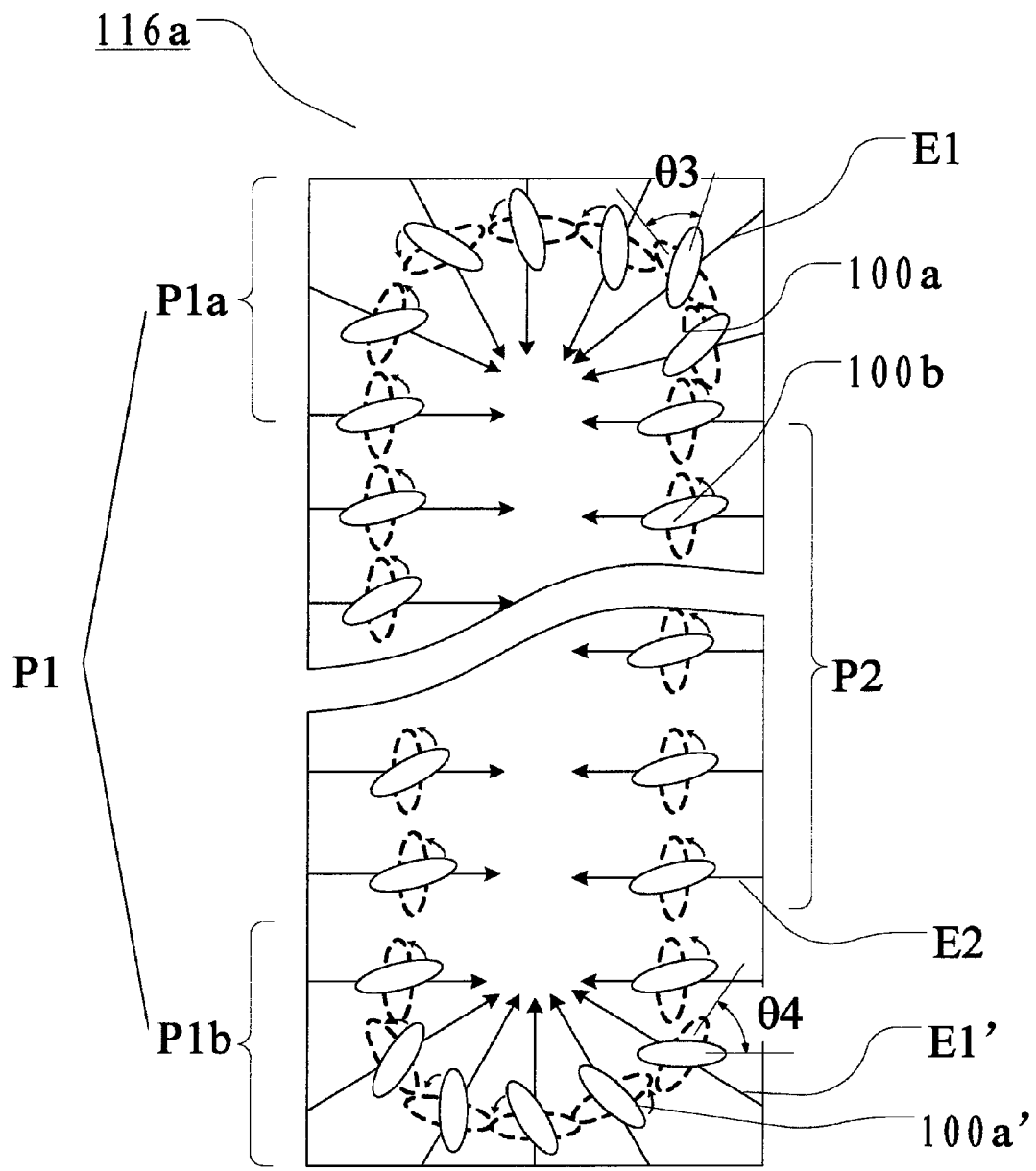
FIG. 1D is another schematic enlarged view of the slit in FIG. 1A.

Additionally, the embodiment is described with an example of liquid crystal molecules have a positive dielectric anisotropy. In an actual implementation, the liquid crystal molecules may have a negative dielectric anisotropy. Referring to FIG. 1D which is another schematic enlarged view of the slit 116a in FIG. 1A. In the case of liquid crystal molecules have a negative dielectric anisotropy, the alignment directions of the alignment layer at the first end region P1a are rotated in the rotation direction of the liquid crystal molecules at a region adjacent to the first end region P1a (i.e. the central region P2) by a rotation angle θ3 to a direction perpendicular to the direction of the electric field E1, where, the rotation angle θ3 satisfies the relation 0°<θ3<90°; and the alignment directions of the alignment layer at the second end region P1b are rotated in the rotation direction of the liquid crystal molecules at a region adjacent to the second end region P1b (i.e. the central region P2) by a rotation angle θ4 to a direction perpendicular to the direction of the electric field E1', where, the rotation angle θ4 satisfies 0°<θ4<90°. In other words, when a voltage is applied to the second electrode 114 and the first electrode 116, the electric field E1 at the first end region P1a, the electric field E1' at the second end region P1b and the electric field E2 at the central region P2 are formed in the slit 116a. The liquid crystal molecules 100b at the central region P2 can be rotated toward a direction perpendicular to a direction of the electric field E2 under the effect of the electric field E2. The alignment directions of the alignment layer at the first end region P1a are configured in such a way that the liquid crystal molecules 100a rotate under the effect of the electric field E1 along the rotation direction of the liquid crystal molecules 100b from the respective initial alignment directions (i.e. the alignment directions of the alignment layer) by rotation angles θ3 to a direction perpendicular to the direction of the electric field E1, where, the rotation angles θ3 satisfy 0°<θ3<90°; and the alignment directions of the alignment layer at the second end region P1b are configured in such a way that the liquid crystal molecules 100a' rotate under the effect of the electric field E1' along the rotation direction of the liquid crystal molecules 100b from the respective initial alignment directions (i.e. the alignment directions of the alignment layer) by rotation angles θ4 to a direction perpendicular to the direction of the electric field E1', where, the rotation angles θ4 satisfy 0°<θ4<90°. In other words, when a voltage is applied to the second electrode 114 and the first electrode 116, the liquid crystal molecules 100a at the first end region P1a, the liquid crystal molecules 100a' at the second end region P1b, and the liquid crystal molecules 100b at the central region P2 have the same rotation direction.

The first electrode 116 in the embodiment has a plurality of slits 116a, each of which has the end region P1 and the central region P2 adjacent to the end region P1. The alignment layers at the end region P1 and the central region P2 have different alignment directions so that the liquid crystal molecules at the end region P1 are rotated in predetermined directions under the effect of the electric fields. Since all of the liquid crystal molecules at the end region P1 are rotated in the same direction, uneven displaying is avoided and transmittance of the display panel is improved.

Figure 2A:
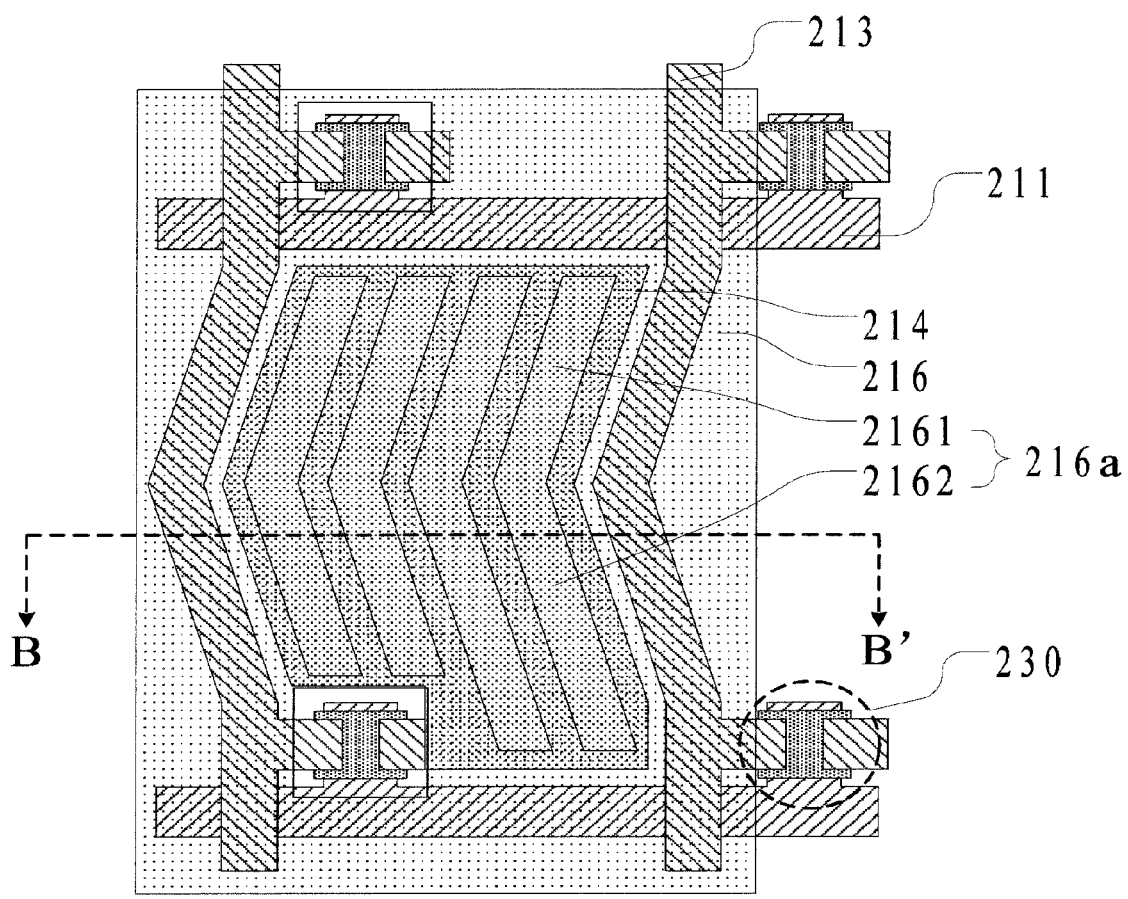
FIG. 2A is a schematic top view showing a structure of a liquid crystal display panel according to another embodiment of the present invention.
Figure 2B:
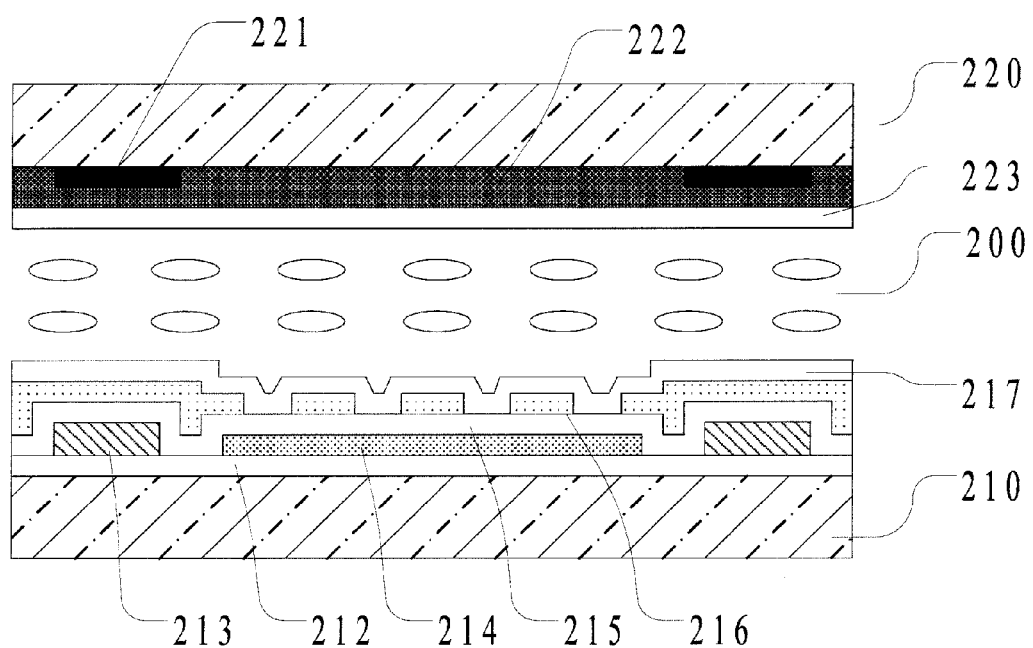
FIG. 2B is a schematic diagram showing the sectional structure taken along a line corresponding to the section BB' in FIG. 2A.

FIG. 2A is a schematic top view showing a structure of a liquid crystal display panel according to another embodiment of the present invention, and FIG. 2B is a schematic diagram showing the sectional structure taken along a line corresponding to the section BB' in FIG. 2A.

With reference to FIGS. 2A and 2B, the horizontal electric field mode liquid crystal display panel includes: a first substrate 210; a second substrate 220 disposed opposite to the first substrate 210; a liquid crystal layer 200 including a plurality of liquid crystal molecules and disposed between the first substrate 210 and the second substrate 220; an alignment layer 217 disposed at one side of the first substrate 210 close to the liquid crystal layer, and an alignment layer 223 disposed at one side of the second substrate 220 close to the liquid crystal layer; a first electrode 216 and a second electrode 214 both disposed on the first substrate 210, so that an electric field for driving liquid crystal molecules to rotate may be formed between the first electrode 216 and the second electrode 214. The first electrode 216 has a plurality of slits 216a.

Specifically, a plurality of scanning lines 211 and a plurality of data lines 213 on the first substrate 210 are insulated from each other, and an insulation layer 212 is provided between the scanning lines 211 and the data lines 213. A pixel unit is defined by a pixel region surrounded by the adjacent scanning lines 211 and the adjacent data lines 213 (one pixel unit is shown in FIG. 2A), and the pixel unit includes the first electrode 216 and the second electrode 214 disposed in a stack manner and insulated from each other. The second electrode 214 has a plane shape, and the first electrode 216 includes a plurality of slits 216a. The pixel unit further includes a thin film transistor (TFT) 230 disposed at an intersection between the scanning lines 211 and the data lines 213, where, a gate electrode of the TFT 230 is electrically connected to the scanning lines 211, a source electrode of the TFT 230 is electrically connected to the data lines 213, and a drain electrode of the TFT 230 is electrically connected to the second electrode 214. An insulation layer 215 is disposed between the second electrode 214 and the first electrode 216, and the alignment layer 217 is disposed on the first electrode 216.

On the second substrate 220, there is a color filter 222 corresponding to the region provided with the pixel unit, and a shading black matrix 221 is disposed between the color filters 222. Additionally, the alignment layer 223 is provided on the color filter 222 on the second substrate. In general, in order to ensure the flatness of the alignment layer, a planarization layer (not shown) is further provided between the color filter 222 and the alignment layer 223.

The first substrate 210 is disposed opposite to the second substrate 220. The liquid crystal layer 200 includes a plurality of liquid crystal molecules disposed in a space between the first substrate and the second substrate, and the alignment layer 217 on the first substrate 210 and the alignment layer 223 on the second substrate 220 are provided at the sides close to the liquid crystal layer 200.

Figure 2C:
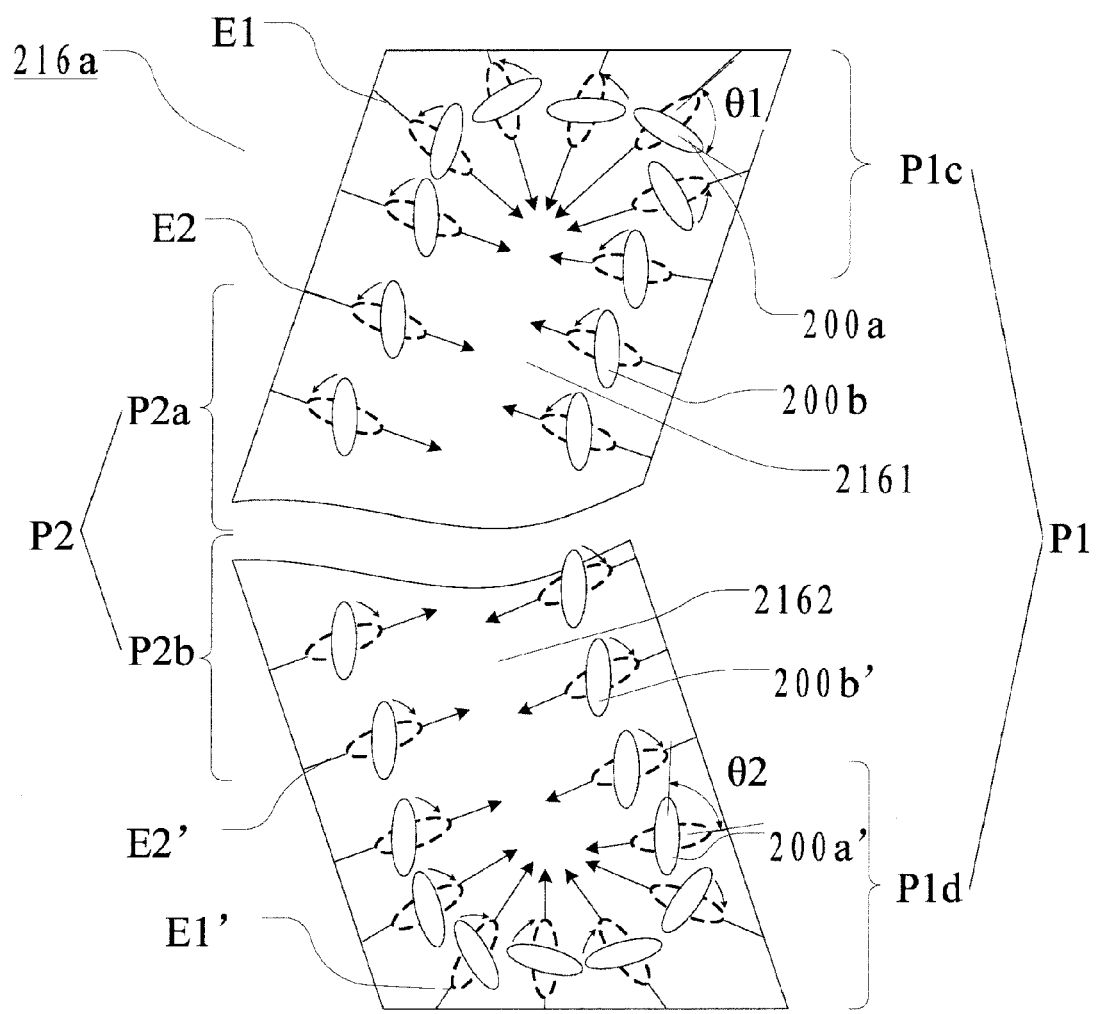
FIG. 2C is a schematic enlarged view of the slit in FIG. 2A.

FIG. 2C is a schematic enlarged view of the slit 216a in FIG. 2A. The slit 216a includes an end region P1 and a central region P2 adjacent to the end region P1. The alignment layers at the end region P1 and the central region P2 have different alignment directions. Since the alignment layers have different alignment directions, the liquid crystal molecules 200a, 200a' at the end region P1, and the liquid crystal molecules 200b, 200b' at the central region P2 have different initial alignment directions.

An electric field for driving the liquid crystal molecules to rotate may be formed (generated) between the second electrode 214 and the first electrode 216. As shown in FIG. 2C, the slit 216a is formed by a first straight portion 2161 and a second straight portion 2162, and the first straight portion 2161 is connected with the second straight portion 2162. The two ends spaced apart from each other of the two straight portions form an end region P1, which includes a third end region P1c and a fourth end region P1d. Remaining region of the two straight portions other than the end region P1 forms a central region P2, which includes a first linear region P2a and a second linear region P2b. The alignment layers at the end region P1 and the central region P2 have different alignment directions. Since the alignment layers have different alignment directions, the liquid crystal molecules 200a at the third end region P1c, the liquid crystal molecules 200a' at the fourth end region P1d, the liquid crystal molecules 200b at the first linear region P2a and the liquid crystal molecules 200b' at the second linear region P2b have different initial alignment directions. As shown in FIG. 2C, the liquid crystal molecules indicated by solid lines are those in initial alignment directions. As can be seen from FIG. 2C, the liquid crystal molecules at the end region P1 have initial alignment directions different from the liquid crystal molecules at the central region P2.

When a voltage is applied to the first electrode 216 and the second electrode 214, an electric field E1 is formed at the third end region P1c, an electric field E1' is formed at the fourth end region P1d, an electric field E2 is formed at the first linear region P2a, and an electric field E2' is formed at the second linear region P2b. When the liquid crystal molecules have a positive dielectric anisotropy, the alignment directions of the alignment layer at the third end region P1c are rotated in the rotation directions of the liquid crystal molecules 200b at a region adjacent to the third end region P1c (i.e. the first linear region P2a) by a rotation angle $\theta 1$ to be parallel to the direction of the electric field E1, where $0°<\theta 1<90°$, so that the liquid crystal molecules 200a at the third end region P1c have a unified rotation direction under the effect of the electric field E1, and the unified rotation direction is consistent with the rotation direction of the liquid crystal molecules 200b at the first linear region P2a. Likewise, the alignment directions of the alignment layer at the fourth end region P1d are rotated in the rotation directions of the liquid crystal molecules 200b' at a region adjacent to the fourth end region P1d (i.e. the second linear region P2b) by a rotation angle $\theta 2$ to be parallel to the direction of the electric field E1', where $0°<\theta 2<90°$, so that the liquid crystal molecules 200a' at the fourth end region P1d have a unified rotation direction under the effect of the electric field E1', and the unified rotation direction is consistent with the rotation direction of the liquid crystal molecules 200b' at the second linear region P2b. In other words, when a voltage is applied to the second electrode 214 and the first electrode 216, the liquid crystal molecules 200a at the third end region P1c rotates toward a direction parallel to the direction of the electric field E1 under the effect of the electric field E1, and the alignment directions of the alignment layer at the third end region P1c are configured in such a way that the liquid crystal molecules 200a have the same rotation direction as the liquid crystal 200b at the first linear region P2a under the effect of electric field E1; under the effect of the electric field E1', the liquid crystal molecule 200a' of the fourth end region P1d rotates toward a direction parallel to a direction of the electric field E1', and the alignment directions of the alignment layer at the fourth end region P1d are configured in such a way that the liquid crystal molecules 200a' have the same rotation direction as the liquid crystal 200b' at the second linear region P2b under the effect of the electric field E1'.

Further, the rotation angles θ1, θ2 satisfy 45°<θ1<90°, 45°<θ2<90°, respectively. The alignment directions of the alignment layer at the third end region P1c are configured in such a way that the liquid crystal molecules 200a rotate under the effect of the electric field E1 from the initial alignment directions (i.e. the alignment directions of the alignment layer) by a rotation angle θ1 to a direction parallel to the direction of the electric field E1, and 45°<θ1<90°; the alignment directions of the alignment layer at the fourth end region P1d are configured in such a way that the liquid crystal molecules 200a' rotate under the effect of the electric field E1' from the respective initial alignment directions (i.e. the alignment directions of the alignment layer) by the rotation angle θ2 to a direction parallel to the direction of the electric field E1', and the rotation angle θ2 satisfies 45°<θ2<90°. A reason for this is that, in the horizontal electric field mode liquid crystal display device, when an azimuthal angle of liquid crystals is 45°, the liquid crystal layer has the highest light transmittance so that the display device has the highest light transmission quantity, thus if the rotation angles θ1, θ2 are larger than 45°, the liquid crystal display device can have the highest luminance in the rotation process of the liquid crystal molecules, to obtain a high contrast of the liquid crystal display device.

If the liquid crystal molecules 200b at the first linear region P2a are rotated in a first rotation direction and the liquid crystal molecules 200b' at the second linear region P2b are rotated in a second rotation direction, then the rotation direction of the liquid crystal molecules 200a at the third end region P1c is the same as the first rotation direction, and the rotation direction of the liquid crystal molecules 200a' at the fourth end region P1d is the same as the second rotation direction. The first rotation direction is different from the second rotation direction.

Figure 2D:
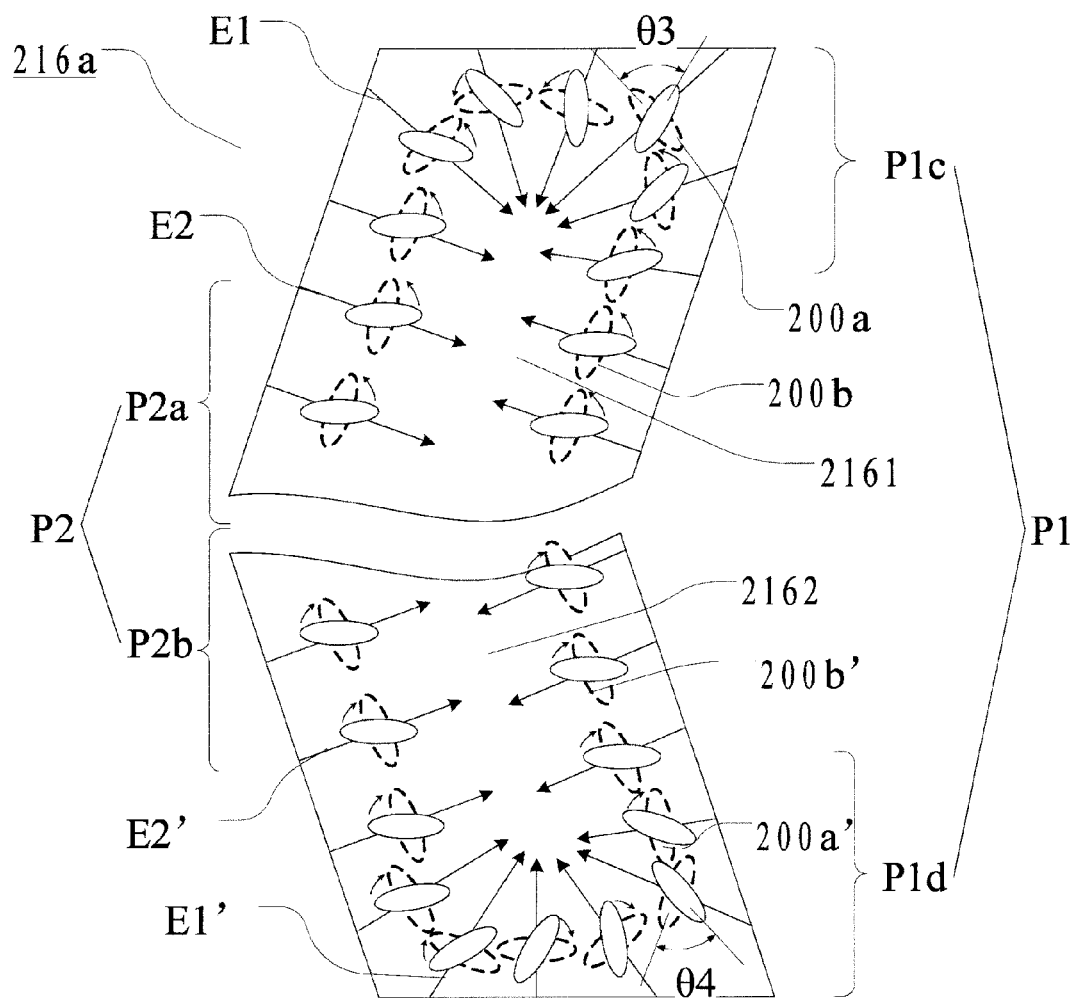
FIG. 2D is another schematic enlarged view of the slit in FIG. 2A.

Additionally, the embodiment is described with an example of liquid crystal molecules have a positive dielectric anisotropy. In an actual implementation, the liquid crystal molecules may have a negative dielectric anisotropy. Referring to FIG. 2D, which is another schematic enlarged view of the slit 216a in FIG. 2A. In the case of liquid crystal molecules have a negative dielectric anisotropy, the alignment directions of the alignment layer at the third end region P1c are rotated in the rotation directions of the liquid crystal molecules 200b at a region adjacent to the third end region P1c (i.e. the first linear region P2a) by a rotation angle θ3 to a direction perpendicular to the direction of the electric field E1, where, the rotation angle θ3 satisfies 0°<θ3<90° so that the liquid crystal molecules 200a at the third end region P1c have a unified rotation direction under the effect of the electric field E1, and the unified rotation direction is consistent with the rotation direction of the liquid crystal molecules 200b at the first linear region P2a; likewise, the alignment directions of the alignment layer at the fourth end region P1d are rotated in the rotation directions of the liquid crystal molecules 200b' at a region adjacent to the fourth end region P1d (i.e., the second linear region P2b) by a rotation angle θ4 to be perpendicular to the direction of the electric field E1', where, where 0°<θ4<90°, so that the liquid crystal molecules 200a' at the fourth end region P1d have a unified rotation direction under the effect of the electric field E1', and the unified rotation direction is consistent with the rotation direction of the liquid crystal molecules 200b' at the second linear region P2b. In other words, when a voltage is applied to the second electrode 214 and the first electrode 216, the liquid crystal molecules 200a at the third end region P1c rotate toward a direction perpendicular to the direction of the electric field E1 under the effect of the electric field E1, and the alignment directions of the alignment layer at the third end region P1c are configured in such a way that the liquid crystal molecules 200a have the same rotation direction as the liquid crystal 200b at the first linear region P2a under the effect of the electric field E1; the liquid crystal molecules 200a' at the fourth end region P1d rotate toward a direction perpendicular to the direction of the electric field E1' under the effect of the electric field E1', and the alignment directions of the alignment layer at the fourth end region P1d are configured in such a way that the liquid crystal molecules 200a' have the same rotation direction as the liquid crystal 200b' at the second linear region P2b under the effect of the electric field E1'.

Additionally, the first linear region P2a and the second linear region P2b in the central region P2 of the slit 216a may be connected with each other directly or via an intermediate connection region in the present embodiment.

Figure 3A:
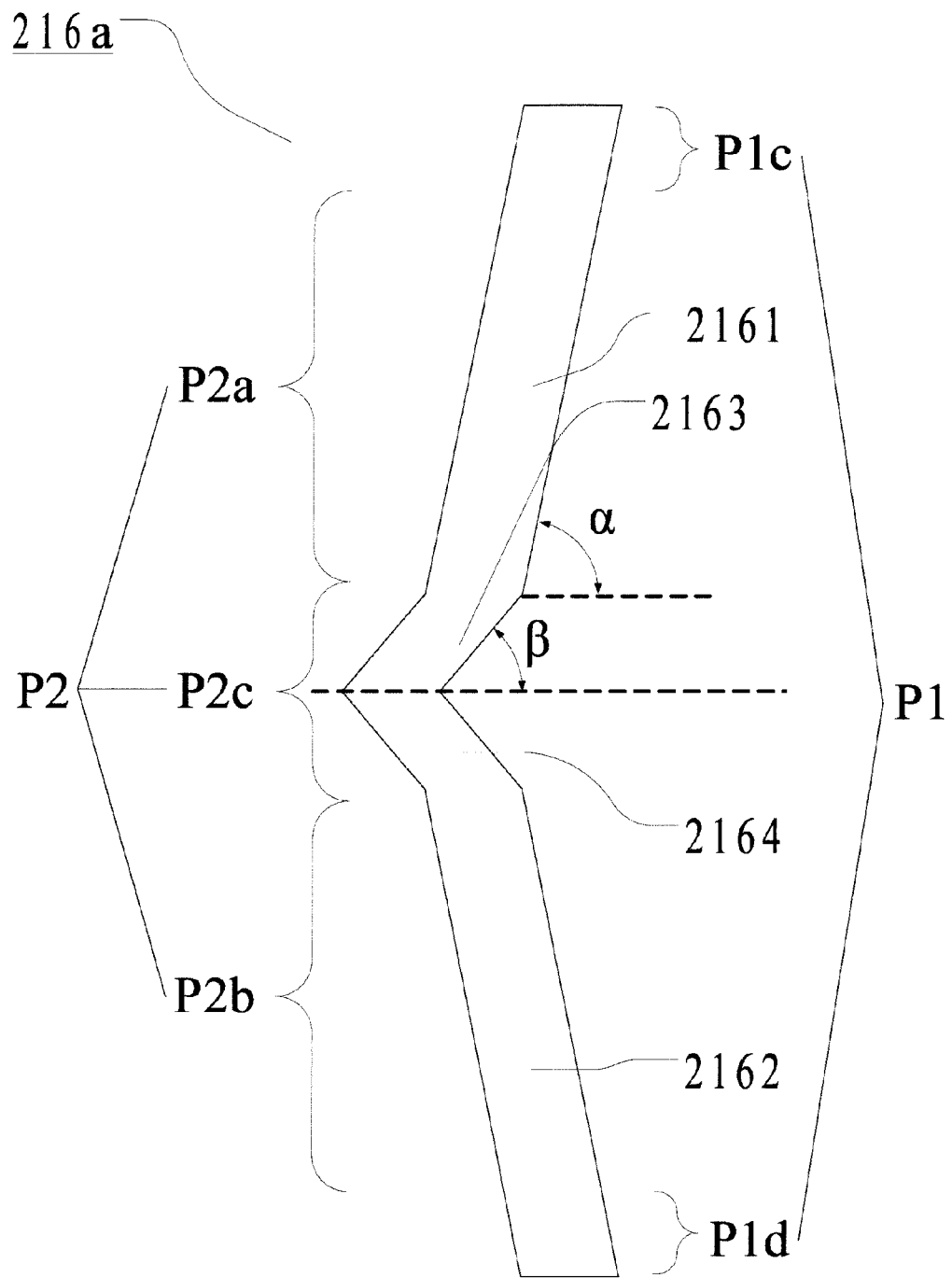
FIG. 3A is a schematic enlarged view of another structure of the slit according to an embodiment of the present invention.

As shown in FIG. 3A which is a schematic enlarged view of another structure of the slit 216a in the embodiment, the slit 216a further includes a first straight portion 2161, a second straight portion 2162, a third straight portion 2163, and a fourth straight portion 2164. The first straight portion 2161 and the second straight portion 2162 are symmetric with each other with respect to an intermediate axis of the slit 216a and incline at an angle α relative to the axis away from each other; likewise, the third straight portion 2163 and the fourth straight portion 2164 are symmetric with each other with respect to the axis of the slit 216a and incline at an angle β relative to the axis away from each other, where, β<α. One end of the third straight portion 2163 is connected with one end of the fourth straight portion 2164, and the other end of the third straight portion 2163 and the other end of the fourth straight portion 2164 are connected with the first straight portion 2161 and the second straight portion 2162, respectively, where, one end of the first straight portion 2161 and one end the second straight portion 2162 form an end portion P1. Specifically, one end of the first straight portion 2161 spaced apart from the third straight portion 2163 forms a third end region P1c, and one end of the second straight portion 2162 spaced apart from the fourth straight portion 2164 forms a fourth end region P1d. The remaining region of the first straight portion 2161 other than the third end region P1c forms a first linear region P2a, and the remaining region of the second straight portion 2162 other than the fourth end region P1d forms a second linear region P2b. The third straight portion 2163 and the fourth straight portion 2164 form a connection region P2c.

A central region P2 of the slit 216a includes the first linear region P2a, the second linear region P2b and the connection region P2c, and an end region P1 of the slit 216a includes the third end region P1c adjacent to one end of the first linear region P2a and the fourth end region P1d adjacent to one end of the second linear region P2b. Assuming the liquid crystal molecules at the first linear region P2a are rotated in a first rotation direction and the liquid crystal molecules at the second linear region P2b are rotated in a second rotation direction, a rotation direction of the liquid crystal molecules at the third end region P1c is the same as the first rotation direction, and a rotation direction of the liquid crystal molecules at the fourth end region P1d is the same as the second rotation direction. The first rotation direction is different from the second rotation direction.

Figure 3B:
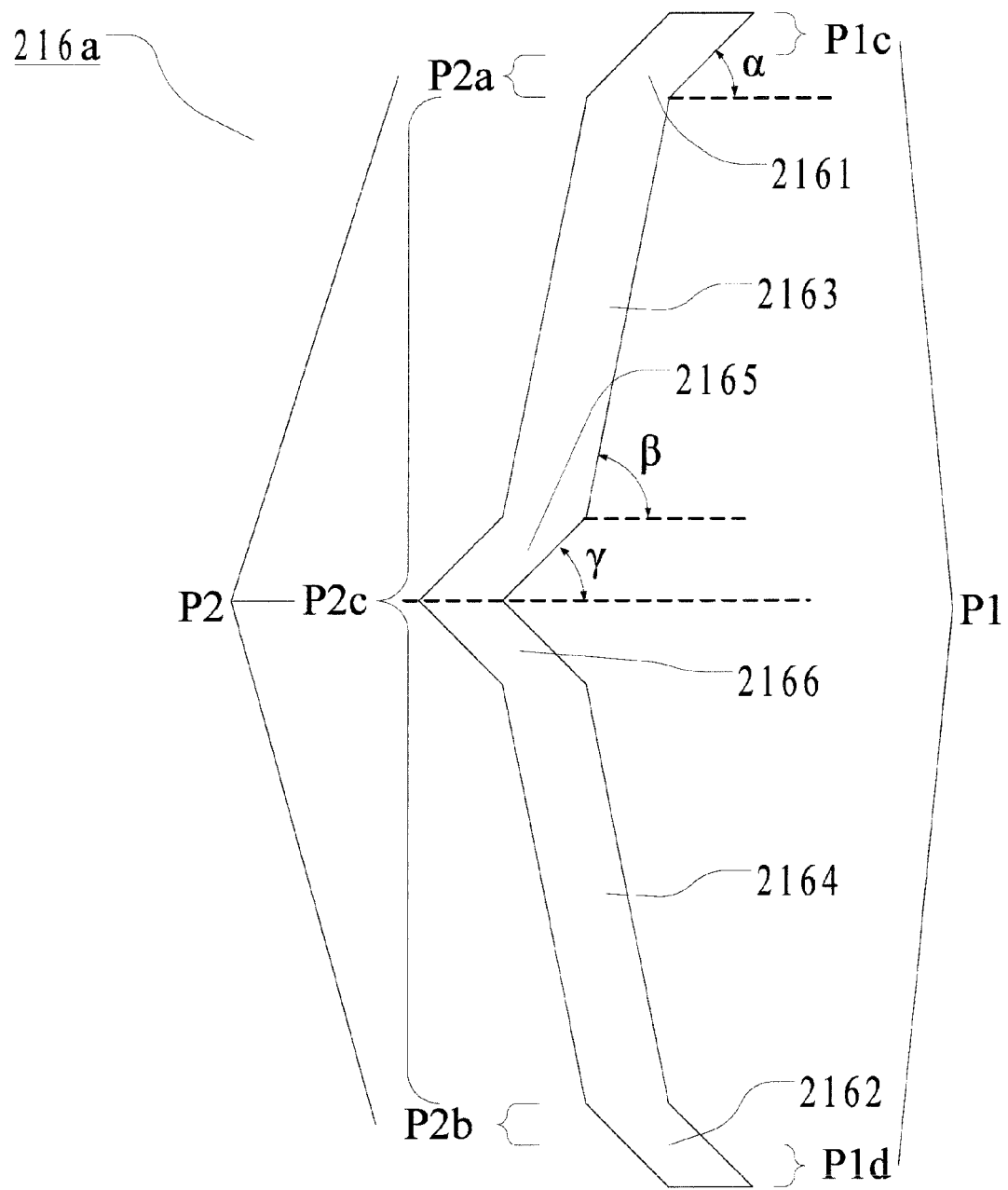
FIG. 3B is a schematic enlarged view of another structure of the slit according to an embodiment of the present invention.

As shown in FIG. 3B which is a schematic enlarged view of another structure of the slit 216a in the embodiment, the slit 216a further includes a first straight portion 2161, a second straight portion 2162, a third straight portion 2163, a fourth straight portion 2164, a fifth straight portion 2165, and a sixth straight portion 2166. The first straight portion 2161 and the second straight portion 2162 are symmetric with each other with respect to an intermediate axis of the slit 216a and incline at an angle α relative to the axis away from each other. Likewise, the third straight portion 2163 and the fourth straight portion 2164 are symmetric with each other with respect to the axis of the slit 216a and incline at an angle β relative to the axis away from each other; the fifth straight portion 2165 and the sixth straight portion 2166 are symmetric with each other with respect to the axis of the slit 216a and incline at an angle γ relative to the axis away from each other, where, β>α, and β>γ. One end of the fifth straight portion 2165 is connected with one end of the sixth straight portion 2166, the other end of the fifth straight portion 2165 and the other end of the sixth straight portion 2166 are connected with one end of the third straight portion 2163 and one end of the fourth straight portion 2164, respectively, and the other end of the third straight portion 2163 and the other end of the fourth straight portion 2164 are connected with the first straight portion 2161 and the second straight portion 2162, respectively, where, one end of the first straight portion 2161 and one end of the second straight portion 2162 form an end portion P1. Specifically, one end of the first straight portion 2161 spaced apart from the third straight portion 2163 forms a third end region P1c, and one end of the second straight portion 2162 spaced apart from the fourth straight portion 2164 forms a fourth end region P1d. Remaining region of the first straight portion 2161 other than the third end region P1c forms a first linear region P2a, and the remaining region of the second straight portion 2162 other than the fourth end region P1d forms a second linear region P2b. The third straight portion 2163, the fourth straight portion 2164, the fifth straight portion 2165, and the sixth straight portion 2166 form a connection region P2c.

A central region P2 of the slit 216a includes the first linear region P2a, the second linear region P2b and the connection region P2c, and an end region P1 of the slit 216a includes the third end region P1c adjacent to one end of the first linear region P2a and the fourth end region P1d adjacent to one end of the second linear region P2b. Assuming the liquid crystal molecules at the first linear region P2a are rotated in a first rotation direction and the liquid crystal molecule at the second linear region P2b are rotated in a second rotation direction; a rotation direction of the liquid crystal molecule at the third end region P1c is the same as the first rotation direction, and a rotation direction of the liquid crystal molecules at the fourth end region P1d is the same as the second rotation direction, where the first rotation direction is different from the second rotation direction.

The first electrode 216 in the present embodiment has a plurality of the slits 216a, each of which has the end region P1 and the central region P2 adjacent to the end region P1. The alignment layers at the end region P1 and the central region P2 have different alignment directions so that the liquid crystal molecules at the end region P1 are rotated in predetermined directions under the effect of the electric fields. Since all of the liquid crystal molecules at the end region P1 are rotated in the same direction, uneven displaying is avoided and transmittance of the display panel is improved.

Since the electrode in the present embodiment has the straight portions extending toward different directions, the liquid crystal molecules are rotated in different directions under the effect of the electric fields, so that viewing angle compensation is obtained, thereby achieving a better viewing angle feature.

Figure 4A:
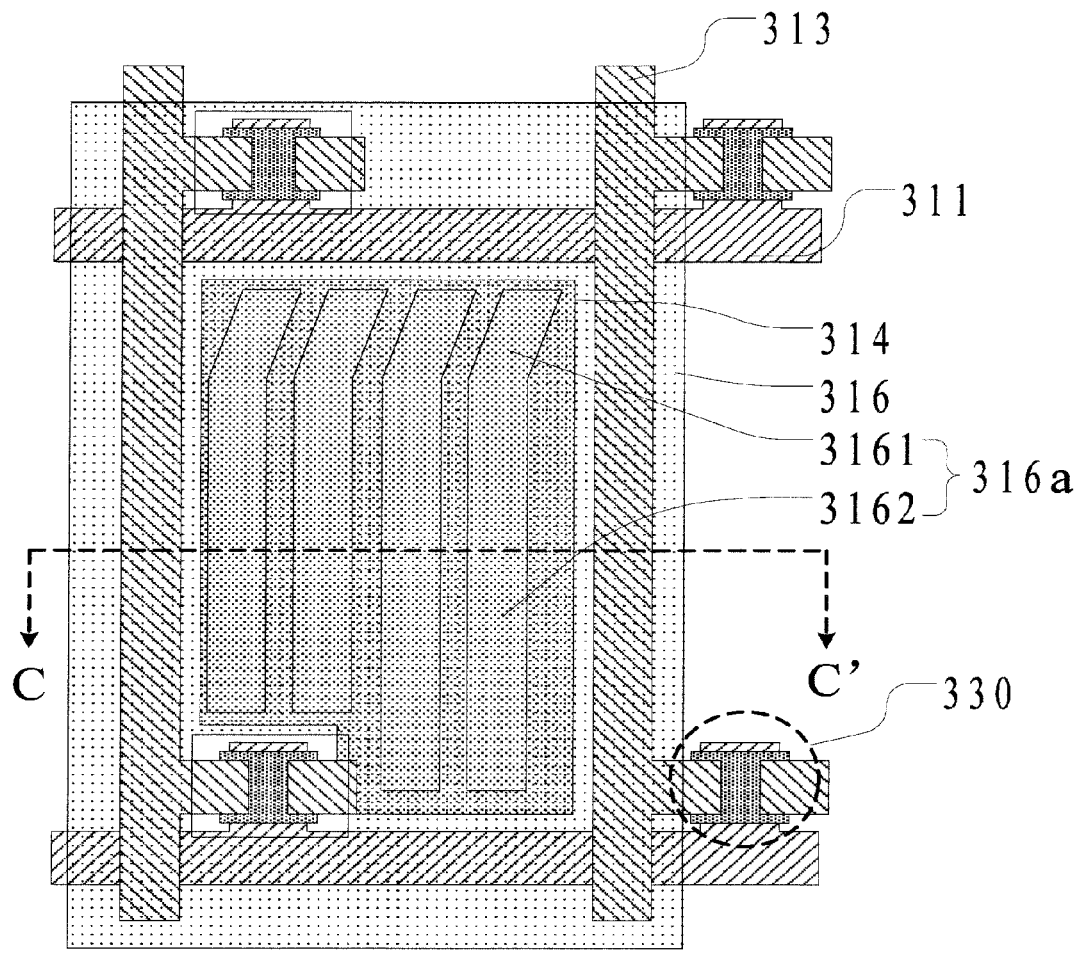
FIG. 4A is a schematic top view showing a structure of a liquid crystal display panel according to another embodiment of the present invention.
Figure 4B:
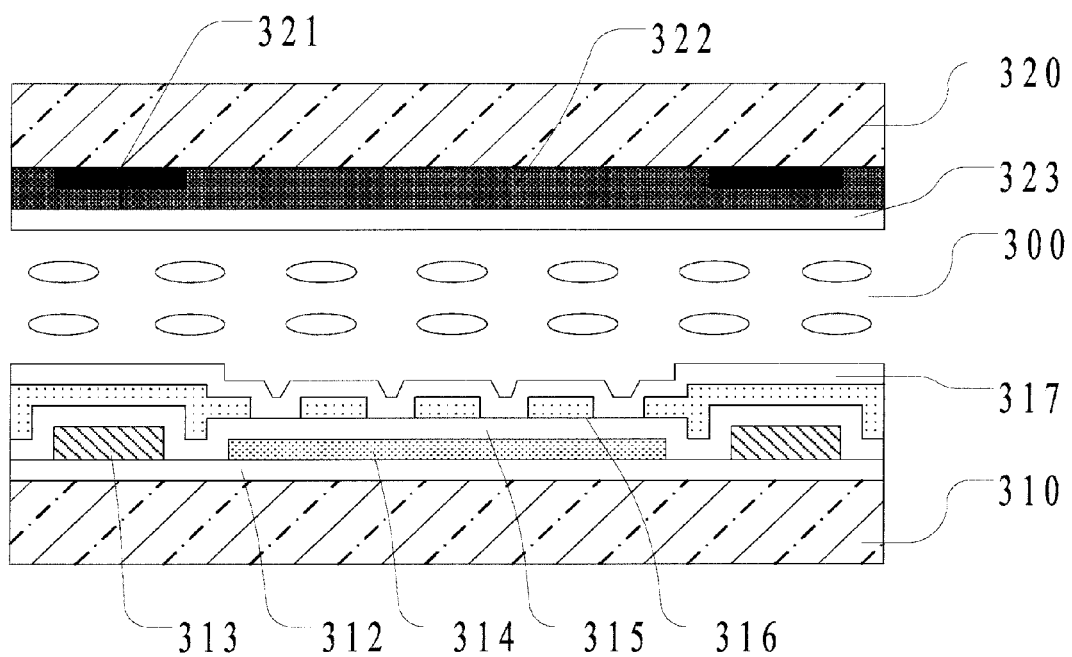
FIG. 4B is a schematic diagram showing the sectional structure taken along a line corresponding to the section CC' in FIG. 4A.

FIG. 4A is a schematic top view showing a structure of a liquid crystal display panel according to another embodiment of the present invention, and FIG. 4B is a schematic diagram showing the sectional structure taken along a line corresponding to the section CC' in FIG. 4A.

With reference to FIGS. 4A and 4B, the horizontal electric field mode liquid crystal display panel includes: a first substrate 310; a second substrate 320 disposed opposite to the first substrate 310; a liquid crystal layer 300 including a plurality of liquid crystal molecules and disposed between the first substrate 310 and the second substrate 320; an alignment layer 317 disposed at one side of the first substrate 310 close to the liquid crystal layer, and an alignment layer 323 disposed at one side of the second substrate 320 close to the liquid crystal layer; a first electrode 316 and a second electrode 314 both disposed on the first substrate 310, so that an electric field for driving liquid crystal molecules to rotate may be formed between the first electrode 316 and the second electrode 314. The first electrode 316 has a plurality of slits 316a.

Specifically, a plurality of scanning lines 311 and a plurality of data lines 313 on the first substrate 310 are insulated from each other, and an insulation layer 312 is provided between the scanning lines 311 and the data lines 313. A pixel unit is defined by a pixel region surrounded by the adjacent scanning lines 311 and the adjacent data lines 313 (one pixel unit is shown in FIG. 4A), and the pixel unit includes the first electrode 316 and the second electrode 314 disposed in a stack manner and insulated from each other. The second electrode 314 has a plane shape, and the first electrode 316 includes a plurality of slits 316a. The pixel unit further includes a thin film transistor (TFT) 330 disposed at an intersection between the scanning lines 311 and the data lines 313, where, a gate electrode of the TFT 330 is electrically connected to the scanning lines 311, a source electrode of the TFT 330 is electrically connected to the data lines 313, and a drain electrode of the TFT 330 is electrically connected to the second electrode 314. An insulation layer 315 is disposed between the second electrode 314 and the first electrode 316, and the alignment layer 317 is disposed on the first electrode 316.

On the second substrate 320, there is a color filter 322 corresponding to the region provided with the pixel unit, and a shading black matrix 321 is disposed between the color filters 322. Additionally, the alignment layer 323 is provided on the color filter 322 on the second substrate. In general, in order to ensure the flatness of the alignment layer, a planarization layer (not shown) is further provided between the color filter 322 and the alignment layer 323.

The first substrate 310 is disposed opposite to the second substrate 320, the liquid crystal layer 300 including a plurality of liquid crystal molecules disposed between the first substrate and the second substrate, and the alignment layer 317 on the first substrate 310 and the alignment layer 323 on the second substrate 320 are provided at the sides close to the liquid crystal layer 300.

Figure 4C:
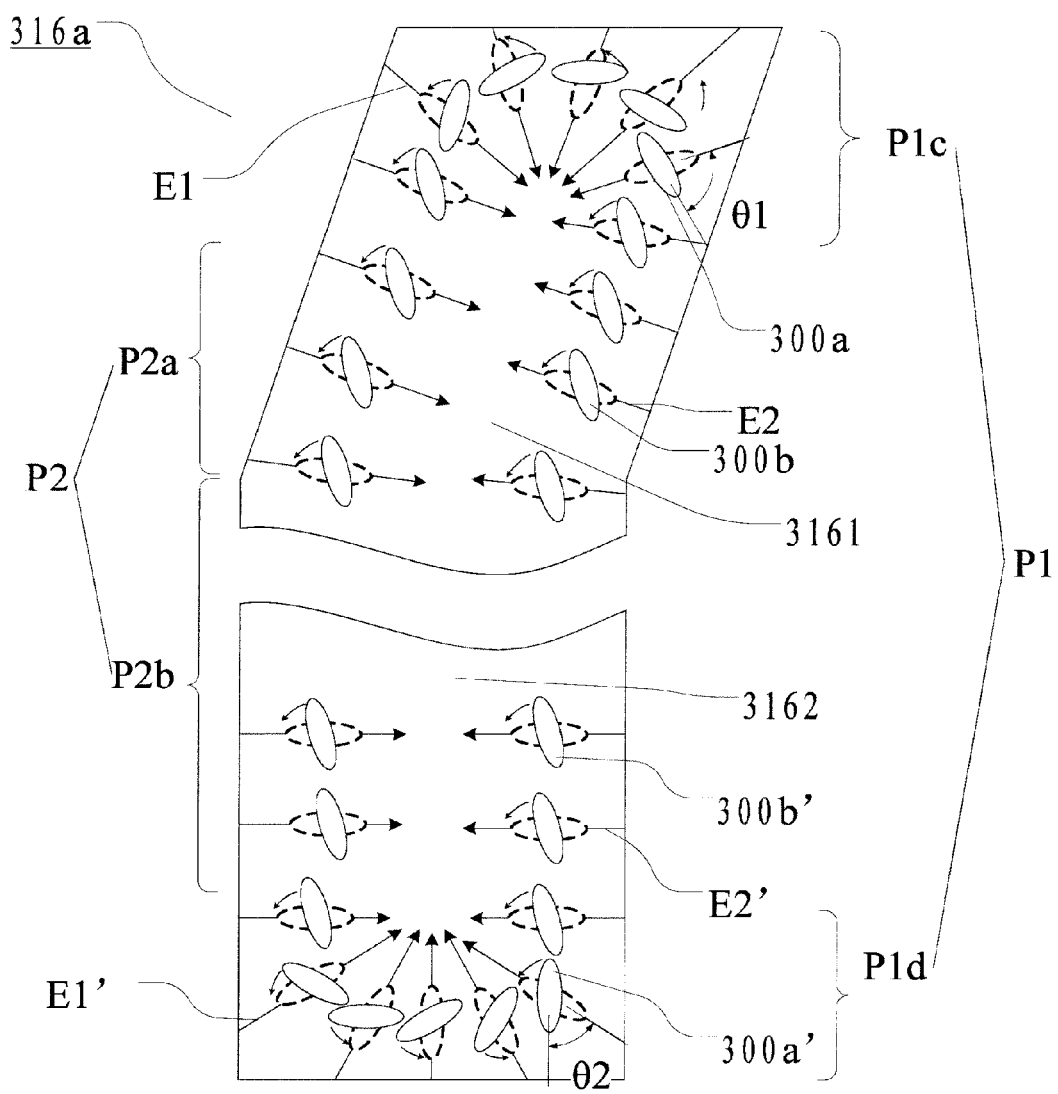
FIG. 4C is a schematic enlarged view of the slit in FIG. 4A.

FIG. 4C is a schematic enlarged view of the slit 316a in FIG. 4A. The slit 316a includes an end region P1 and a central region P2 adjacent to the end region P1. The alignment layers at the end region P1 and the central region P2 have different alignment directions. Since the alignment layers have different alignment directions, the liquid crystal molecules 300a, 300a' at the end region P1, and the liquid crystal molecules 300b, 300b' at the central region P2 have different initial alignment directions.

An electric field for driving the liquid crystal molecules to rotate may be formed between the second electrode 314 and the first electrode 316. As shown in FIG. 3C, the slit 316a is formed by a first straight portion 3161 and a second straight portion 3162, and one end of the first straight portion 3161 is connected with one end of the second straight portion 3162. Two ends spaced apart from each other of the two straight portions form an end region P1, which includes a third end region P1c and a fourth end region P1d. Remaining region of the two straight portions other than the end region P1 forms a central region P2, which includes a first linear region P2a and a second linear region P2b. The alignment layers at the end region P1 and the central region P2 have different alignment directions. Since the alignment layers have different alignment directions, the liquid crystal molecules 300a at the third end region P1c, the liquid crystal molecules 300a' at the fourth end region P1d, the liquid crystal molecules 300b at the first linear region P2a and the liquid crystal molecules 300b' at the second linear region P2b have different initial alignment directions. As shown in FIG. 4C, the liquid crystal molecules indicated by solid lines are those in initial alignment directions. As can be seen from FIG. 4C, the liquid crystal molecules at the end region P1 have initial alignment directions different from the liquid crystal molecules at the central region P2.

When a voltage is applied to the first electrode 316 and the second electrode 314, an electric field E1 is formed at the third end region P1c, an electric field E1' is formed at the fourth end region P1d, an electric field E2 is formed at the first linear region P2a, and an electric field E2' is formed at the second linear region P2b. When the liquid crystal molecules have a positive dielectric anisotropy, the alignment directions of the alignment layer at the third end region P1c are rotated in the rotation directions of the liquid crystal molecules 300b at a region adjacent to the third end region P1c (i.e. the first linear region P2a) by a rotation angle θ1 to be parallel to the direction of the electric field E1, where 0°<θ1<90°, so that the liquid crystal molecules 300a at the third end region P1c have a unified rotation direction under the effect of the electric field E1, and the unified rotation direction is consistent with the rotation direction of the liquid crystal molecule 300b at the first linear region P2a. Likewise, the alignment directions of the alignment layer at the fourth end region P1d are rotated in the rotation directions of the liquid crystal molecules 300b' at a region adjacent to the fourth end region P1d (i.e. the second linear region P2b) by a rotation angle θ2 to be parallel to the direction of the electric field E1', where, 0°<θ2<90', so that the liquid crystal molecules 300a' at the fourth end region P1d have a unified rotation direction under the effect of the electric field E1', and the unified rotation direction is consistent with the rotation direction of the liquid crystal molecule 300b' at the second linear region P2b. In other words, when a voltage is applied to the second electrode 314 and the first electrode 316, the liquid crystal molecules 300a of the third end region P1c rotate toward a direction parallel to the direction of the electric field E1 under the effect of the electric field E1, and the alignment directions of the alignment layer at the third end region P1c are configured in such a way that the liquid crystal molecules 300a have the same rotation direction as the liquid crystal 300b at the first linear region under the effect of the electric field E1; the liquid crystal molecules 300a' at the fourth end region P1d rotate toward a direction parallel to a direction of the electric field E1' under the effect of the electric field E1', and the alignment directions of the alignment layer at the fourth end region P1d are configured in such a way that the liquid crystal molecules 300a' have the same rotation direction as the liquid crystal 300b' of the second linear region under the effect of the electric field E1'.

Further, the rotation angles θ1, θ2 satisfy the relations 45°<θ1<90°, 45°<θ2<90°, respectively. The alignment directions of the alignment layer at the third end region P1c are configured in such a way that the liquid crystal molecules 300a rotate under the effect of the electric field E1 from the initial alignment directions (i.e. the alignment directions of the alignment layer) by a rotation angle θ1 to a direction parallel to the direction of the electric field E1, where, the rotation angle θ1 satisfies 45°<θ1<90°; the alignment directions of the alignment layer at the fourth end region P1d are configured in such a way that the liquid crystal molecules 300a' rotate under the effect of the electric field E1' from the initial alignment directions (i.e. the alignment directions of the alignment layer) by a rotation angle θ2 to a direction parallel to the direction of the electric field E1', where, the rotation angle θ2 satisfy the relation 45°<θ2<90°. A reason for this is that, in the horizontal electric field mode liquid crystal display device, when an azimuthal angle of liquid crystal is 45°, the liquid crystal layer has the highest light transmittance so that the display device has the highest light transmission quantity, thus if the rotation angles θ1, θ2 are larger than 45°, the liquid crystal display device can have the highest luminance in the rotation process of the liquid crystal molecules, to obtain a high contrast of the liquid crystal display device.

If the liquid crystal molecule 300b at the first linear region P2A are rotated in a first rotation direction and the liquid crystal molecule 300b' at the second linear region P2b are rotated in a second rotation direction, then the rotation direction of the liquid crystal molecule 300a at the third end region P1c is the same as the first rotation direction, and the rotation direction of the liquid crystal molecule 300a' at the fourth end region P1d is the same as the second rotation direction, where the first rotation direction is the same as the second rotation direction.

Figure 4D:
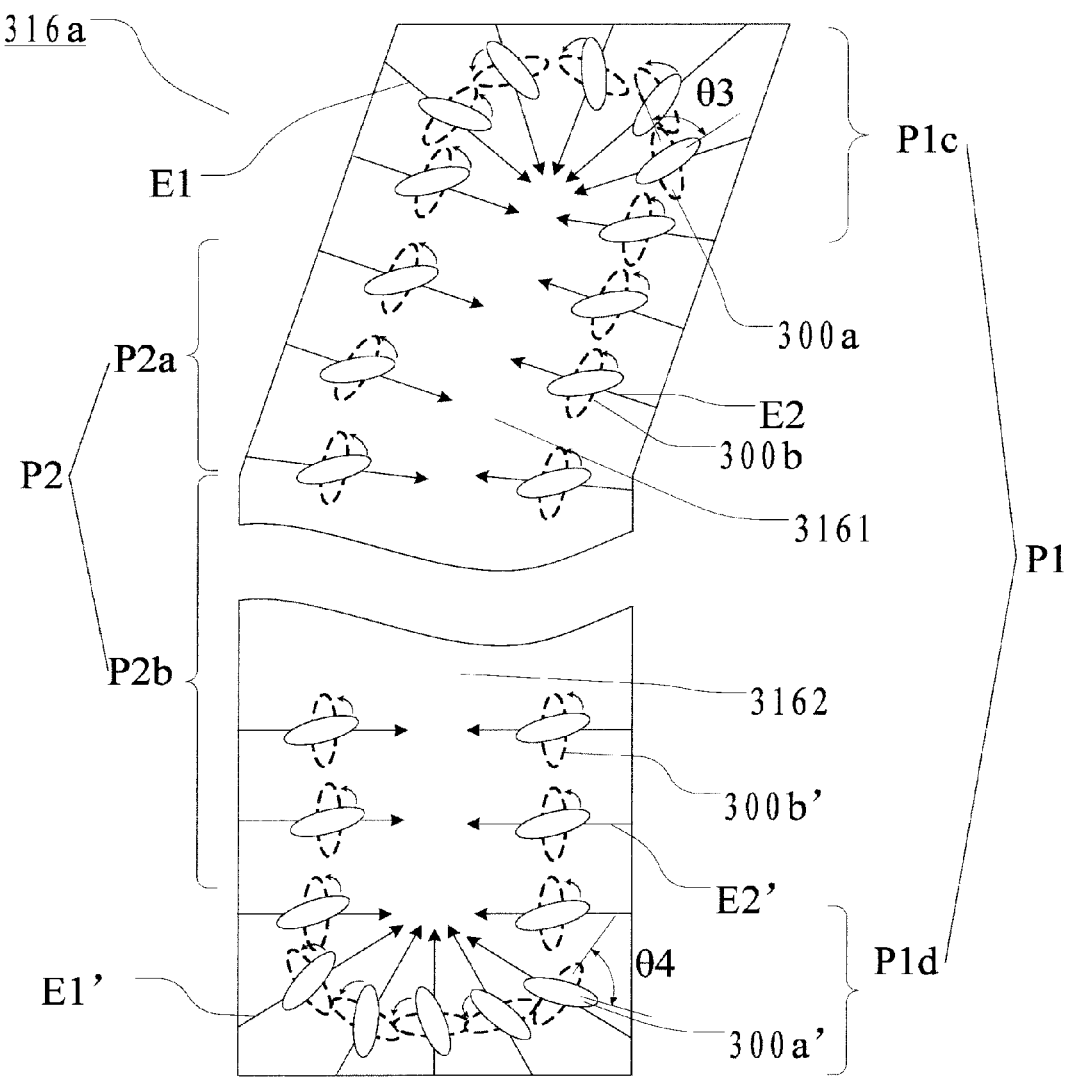
FIG. 4D is another schematic enlarged view of the slit in FIG. 4A.

Additionally, the embodiment is described with an example of liquid crystal molecules have a positive dielectric anisotropy. In an actual implementation, the liquid crystal molecules may have a negative dielectric anisotropy. Referring to FIG. 4D, which is another enlarged view of the slit 316a in FIG. 4A. In the case of liquid crystal molecules have a negative dielectric anisotropy, the alignment directions of the alignment layer at the third end region P1c are rotated in the rotation directions of the liquid crystal molecules 300b at a region adjacent to the third end region P1c (i.e. the first linear region P2a) by a rotation angle θ3 to a direction perpendicular to the direction of the electric field E1, where, the rotation angle θ3 satisfy 0°<θ3<90° so that the liquid crystal molecules 300a at the third end region P1c have a unified rotation direction under the effect of the electric field E1, and the unified rotation direction is consistent with the rotation direction of the liquid crystal molecule 300b at the first linear region P2a. Likewise, the alignment directions of the alignment layer at the fourth end region P1d are rotated in the rotation directions of the liquid crystal molecules 300b' at a region adjacent to the fourth end region P1d (i.e. the second linear region P2b) by a rotation angle θ4 to be perpendicular to the direction of the electric field E1', where the rotation angle θ4 satisfies 0°<θ4<90° so that the liquid crystal molecules 300a' at the fourth end region P1d have a unified rotation direction under the effect of electric field E1', and the unified rotation direction is consistent with the rotation direction of the liquid crystal molecule 300b' at the second linear region P2b. In other words, when a voltage is applied to the second electrode 314 and the first electrode 316, the liquid crystal molecules 300a at the third end region P1c rotate toward a direction perpendicular to the direction of the electric field E1 under the effect of the electric field E1, and the alignment directions of the alignment layer at the third end region P1c are configured in such a way that the liquid crystal molecules 300a have the same rotation direction as the liquid crystal 300b at the first linear region P2a under the effect of the electric field E1; the liquid crystal molecules 300a' at the fourth end region P1d rotate toward a direction perpendicular to the direction of the electric field E1' under the effect of the electric field E1', and the alignment directions of the alignment layer at the fourth end region P1d are configured in such a way that the liquid crystal molecules 300a' have the same rotation direction as the liquid crystal 300b' at the second linear region P2b under the effect of the electric field E1'.

Additionally, the first linear region P2a and the second linear region P2b in the central region P2 of the slit 316a may be connected with each other directly or via an intermediate connection region in the present embodiment.

Figure 5:
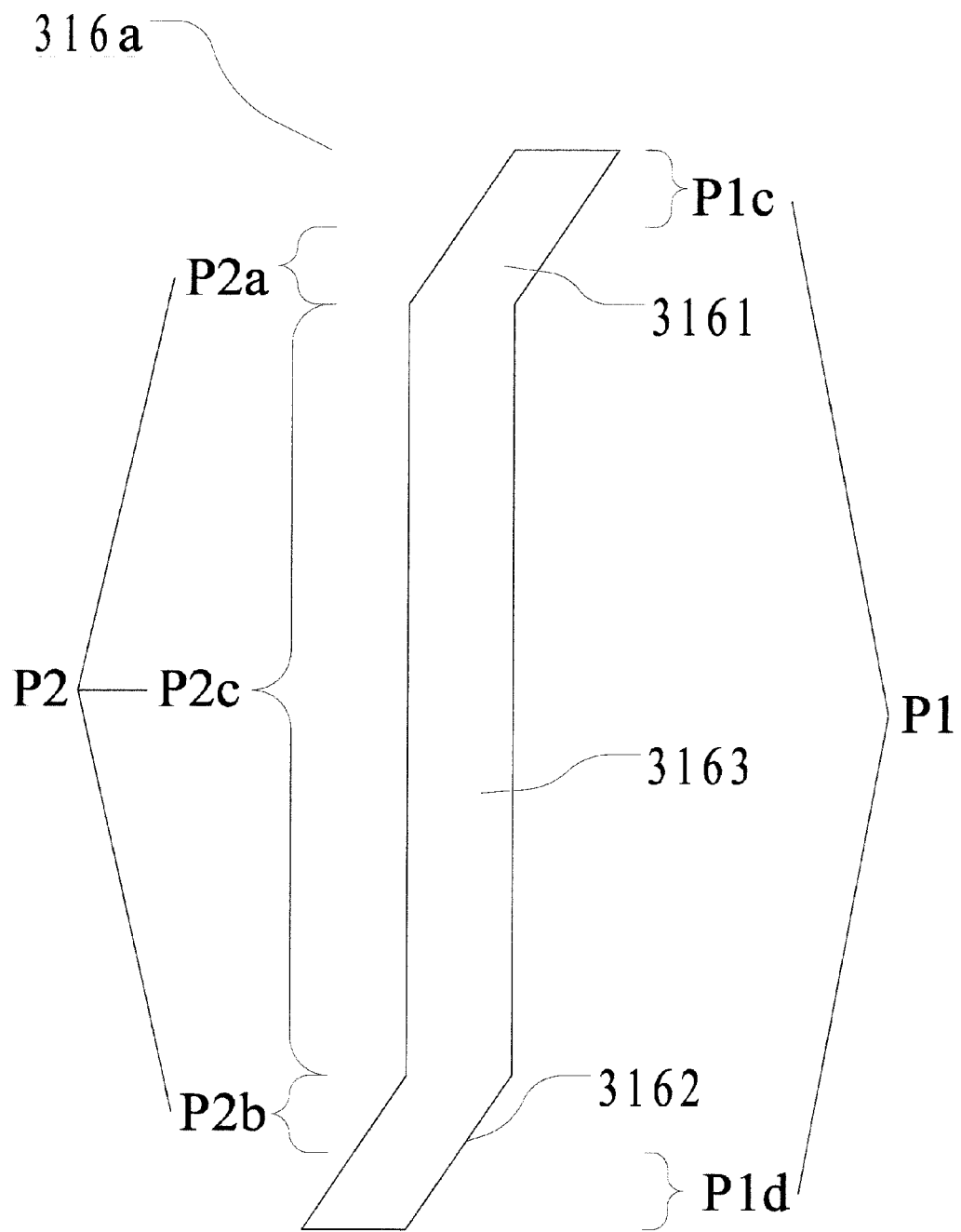
FIG. 5 is a schematic enlarged view of another structure of the slit according to an embodiment of the present invention.

FIG. 5 is a schematic enlarged view of another structure of the slit 316a in the embodiment. The slit 316a further includes a first straight portion 3161, a second straight portion 3162, and a third straight portion 3163. The third straight portion 3163 is located between the first straight portion 3161 and the second straight portion 3162 and connected with the first straight portion 3161 and the second straight portion 3162, and the first straight portion 3161 and the second straight portion 3162 incline at some angle relative to the third straight portion 3163 away from each other. One end of the first straight portion 3161 and one end of the second straight portion 3162 form an end portion P1. Specifically, one end of the first straight portion 3161 spaced apart from the third straight portion 3163 forms a third end region P1c, and one end of the second straight portion 3162 spaced apart from the third straight portion 3163 forms a fourth end region P1d. A remaining region of the first straight portion 2161 other than the third end region P1c forms a first linear region P2a, and a remaining region of the second straight portion 2162 other than the fourth end region P1d forms a second linear region P2b. The third straight portion 2163 forms a connection region P2c.

A central region P2 of the slit 316a includes the first linear region P2a, the second linear region P2b and the connection region P2c, and an end region P1 of the slit 316a includes the third end region P1c adjacent to one end of the first linear region P2a and the fourth end region P1d adjacent to one end of the second linear region P2b. Assuming the liquid crystal molecules at the first linear region P2a are rotated in a first rotation direction, and the liquid crystal molecules at the second linear region P2b are rotated in a second rotation direction; a rotation direction of the liquid crystal molecule at the third end region P1c is the same as the first rotation direction, a rotation direction of the liquid crystal molecule at the fourth end region P1d is the same as the second rotation direction, and the first rotation direction is the same as the second rotation direction.

The first electrode 316 in the present embodiment has a plurality of slit 316a, each of which has the end region P1 and the central region P2 adjacent to the end region. The alignment layers at the end region P1 and the central region P2 have different alignment directions so that the liquid crystal molecules of the end region P1 are rotated in predetermined directions under the effect of the electric fields. Since all of the liquid crystal molecules at the end region P1 are rotated in the same directions, uneven displaying is avoided and transmittance of the display panel is improved.

Since the electrode in the present embodiment has bent portions extending toward different directions, reverse rotation of the liquid crystal molecules in the bent portions can be effectively avoided, thereby achieving a better effect of avoiding uneven display.

In the above embodiments, the first electrode and the second electrode are located at different layers, the first electrode includes a plurality of slits and the second electrode has a plane shape. However, in an actual implementation, the first electrode and the second electrode both can include a plurality of slits, and the slits of the second electrode and the slits of the first electrode are staggered. Alternatively, the first electrode and the second electrode are located at the same layer or different layers, and both include a plurality of branch electrodes, and the branch electrodes of the first electrode and the branch electrodes of the second electrode are alternately and separately arranged.

Figure 6A:
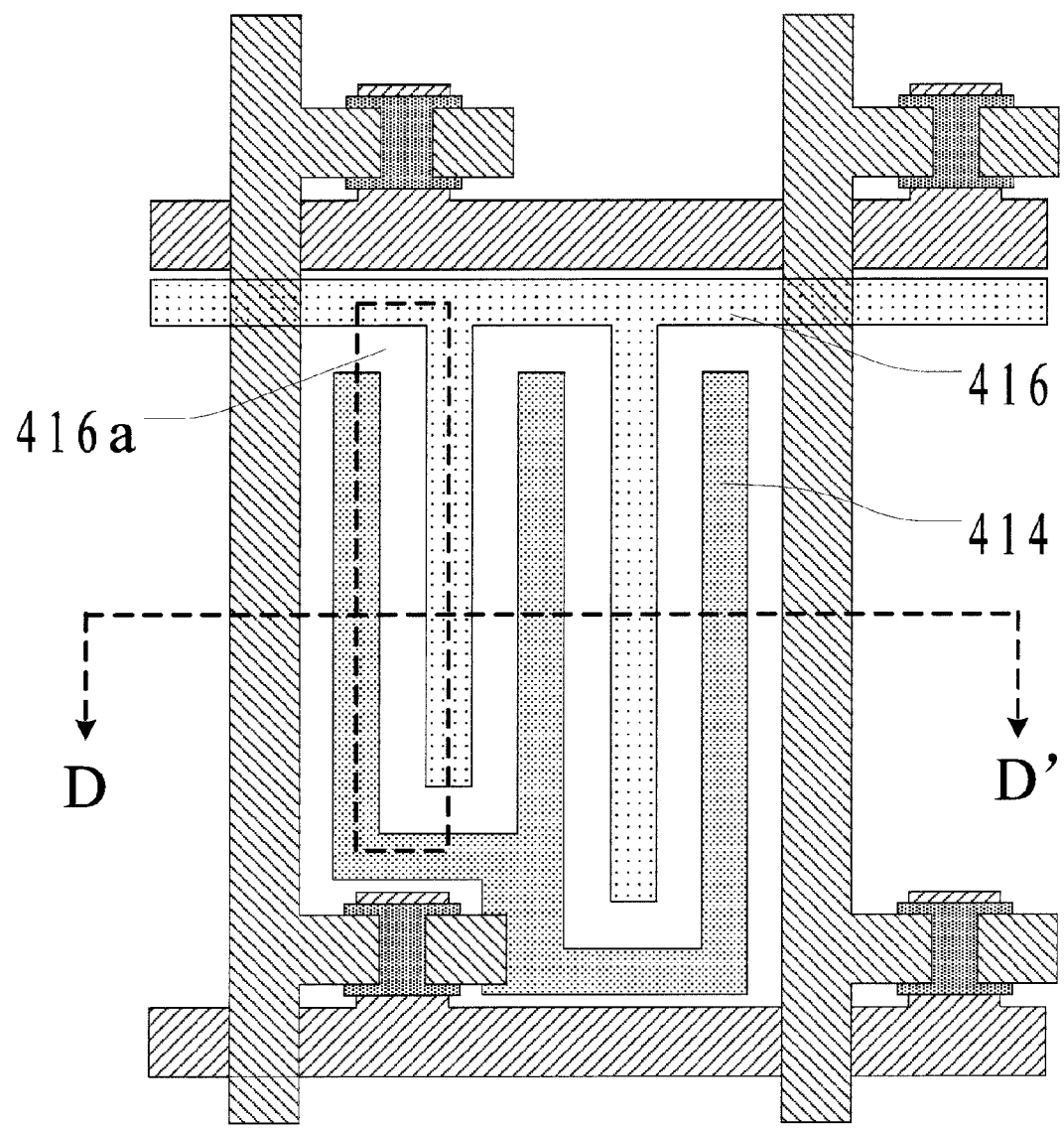
FIG. 6A is a schematic top view showing a structure of a liquid crystal display panel according to another embodiment of the present invention.
Figure 6B:
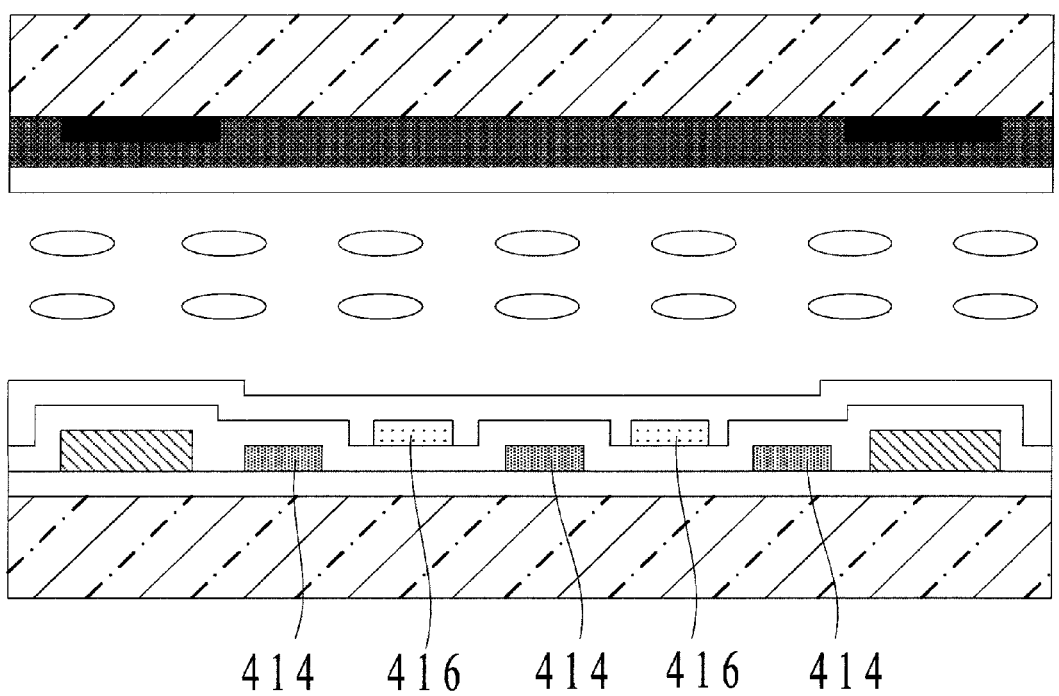
FIG. 6B is a schematic diagram showing the sectional structure taken along a line corresponding to the section DD' in FIG. 6A.
Figure 6C:
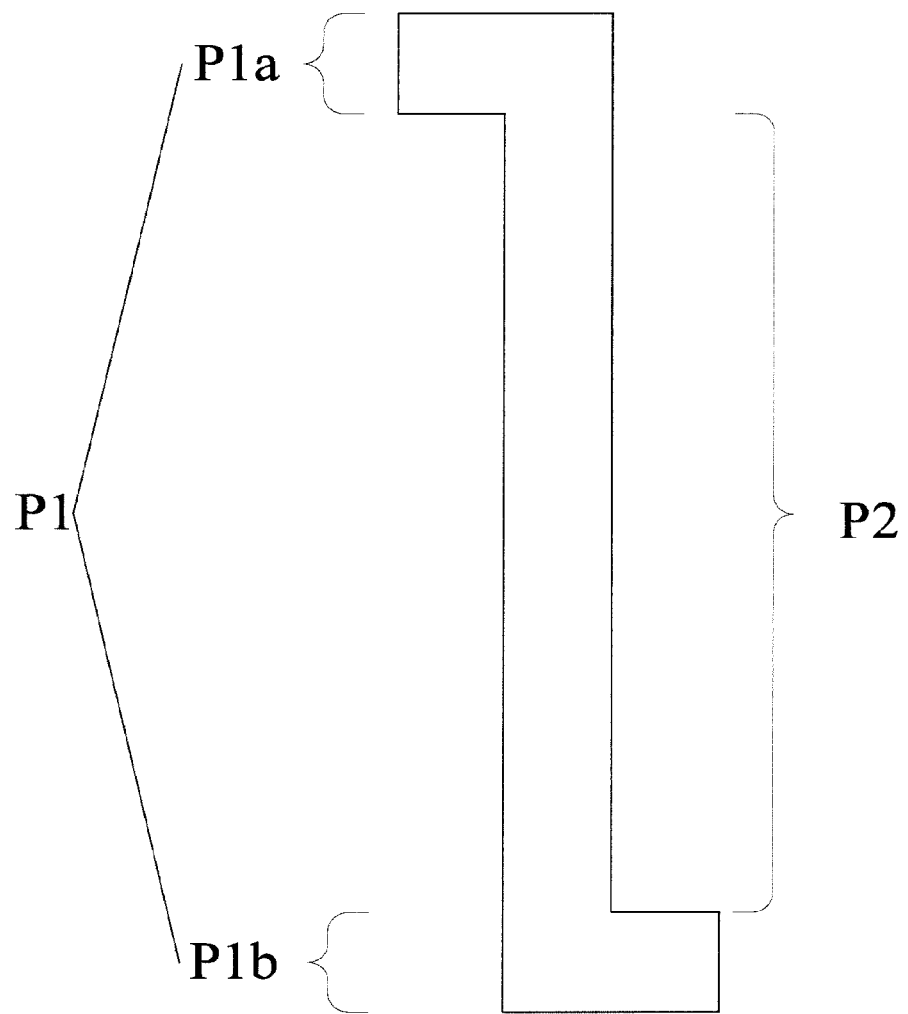
FIG. 6C is a schematic enlarged view of the slit in FIG. 6A.

FIG. 6A is a schematic top view showing the structure of a liquid crystal display panel according to another embodiment of the present invention, FIG. 6B is a schematic diagram showing the sectional structure taken along a line corresponding to the section DD' in FIG. 6A, and FIG. 6C is a schematic enlarged view of a slit 616a in FIG. 6A. In combination of FIGS. 6A to 6C, a first electrode 416 and a second electrode 414 of the horizontal electric field mode liquid crystal display panel are located at different layers, and are comb-shaped electrodes. The first electrode 416 and the second electrode 414 each include a plurality of branch electrodes, and the branch electrodes of the first electrode 416 and the branch electrodes of the second electrode 414 are alternately arranged separately.

As shown in FIG. 6A, the first electrode 416 and the second electrode 414 are comb-shaped electrodes, and include a plurality of bar-shaped branch electrodes arranged separately from each other, and a plurality of slits 416a are formed between the first electrode 416 and the second electrode 414 (a dashed box in FIG. 6A indicates one of the slits).

As shown in FIG. 6B, the first electrode 416 and the second electrode 414 may be located at different layers, and the branch electrodes of the first electrode 416 and the branch electrodes of the second electrode 414 are alternately arranged separately.

As shown in FIG. 6C, the slit 416a has an end region P1 and a central region P2 adjacent to the end region P1, and alignment layers at the end region P1 and the central region P2 have different alignment directions. In the present embodiment, the end region includes a first end region P1a and a second end region P1b respectively adjacent to two ends of the central region P2. When a voltage is applied to the first electrode 416 and the second electrode 414, the rotation direction of the liquid crystal molecules at the first end region P1a and the rotation direction of the liquid crystal molecules at the second end region P1b are the same as the rotation direction of the liquid crystal molecules at the central region P2.

Additionally, the first electrode 416 and the second electrode 414 may be located at different layers or the same layer in the present embodiment.

There are a plurality of slits 416a between the first electrode 416 and the second electrode 414 in the present embodiment. The slit 416a has the end region P1 and the central region P2 adjacent to the end region. The alignment layers at the end region P1 and the central region P2 have different alignment directions so that the liquid crystal molecules of the end region P1 are rotated in predetermined directions under the effect of the electric fields. Since all of the liquid crystal molecules of the end region P1 are rotated in the same directions, uneven displaying is avoided and transmittance of the display panel is improved.

Figure 7A:
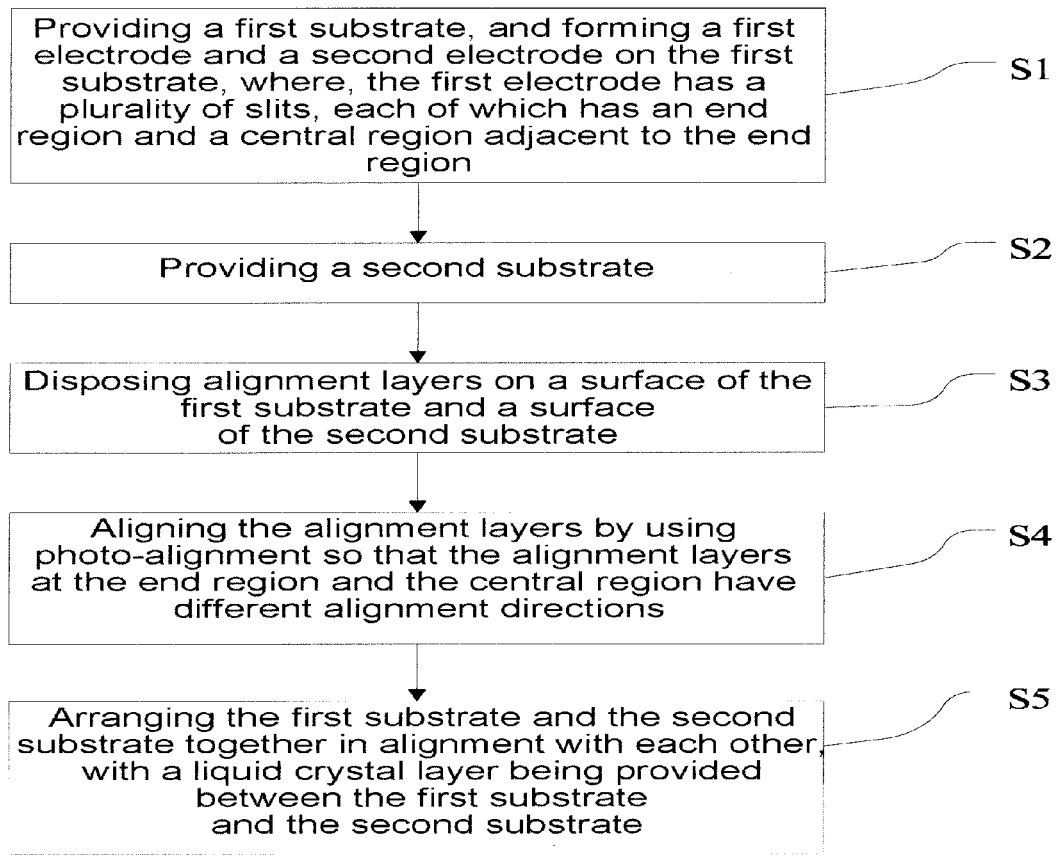
FIG. 7A is a simplified flowchart diagram of a manufacturing process of the above liquid crystal display panel according to an embodiment of the present invention.

FIG. 7A is a schematic diagram of a manufacturing process of the above liquid crystal display panel according to an embodiment of the present invention. The liquid crystal display panel includes: a first substrate; a second substrate disposed opposite to the first substrate; a liquid crystal layer including a plurality of liquid crystal molecules and disposed between the first substrate and the second substrate; an alignment layer disposed at one side of the first substrate close to the liquid crystal layer and an alignment layer disposed at one side of the second substrate close to the liquid crystal layer; and a first electrode and a second electrode both disposed on the first substrate, where an electric field for driving liquid crystal molecules to rotate may be formed between the first electrode and the second electrode. The first electrode has a plurality of slits, each of which has an end region and a central region adjacent to the end region, and the alignment layers at the end region and the central region have different alignment directions.

The manufacturing process of the liquid crystal panel includes Steps S1 to S5 below.

Step S1: providing a first substrate, and forming a first electrode and a second electrode on the first substrate, where an electric field for driving liquid crystal molecules to rotate may be formed between the first electrode and the second electrode, and the first electrode has a plurality of slits, each of which has an end region and a central region adjacent to the end region.

Step S2: providing a second substrate.

Step S3: disposing an alignment layer on an inner surface of the first substrate and an alignment layer on an inner surface of the second substrate.

Step S4: aligning the alignment layers by a photo-alignment process so that the alignment layers at the end region and the central region have different alignment directions; specifically, an electric field is formed at the end region, and when liquid crystal molecules have a positive dielectric anisotropy are adopted, the alignment directions of the alignment layers at the end region are rotated in a rotation direction of the liquid crystal molecules at a region adjacent to the end region by a rotation angle θ to a direction parallel to the direction of the electric field, where, the rotation angle θ satisfies the relation 0°<θ<90°; and when liquid crystal molecules have a negative dielectric anisotropy are adopted, the alignment directions of the alignment layers at the end region are rotated in the rotation direction of the liquid crystal molecules at a region adjacent to the end region by a rotation angle θ to a direction perpendicular to the direction of the electric field, where, the rotation angle θ satisfies the relation 0°<θ<90°.

Step S5: arranging the first substrate and the second substrate together in alignment with each other, and disposing a liquid crystal layer having a plurality of liquid crystal molecules in a space between the first substrate and the second substrate.

Figure 7B:
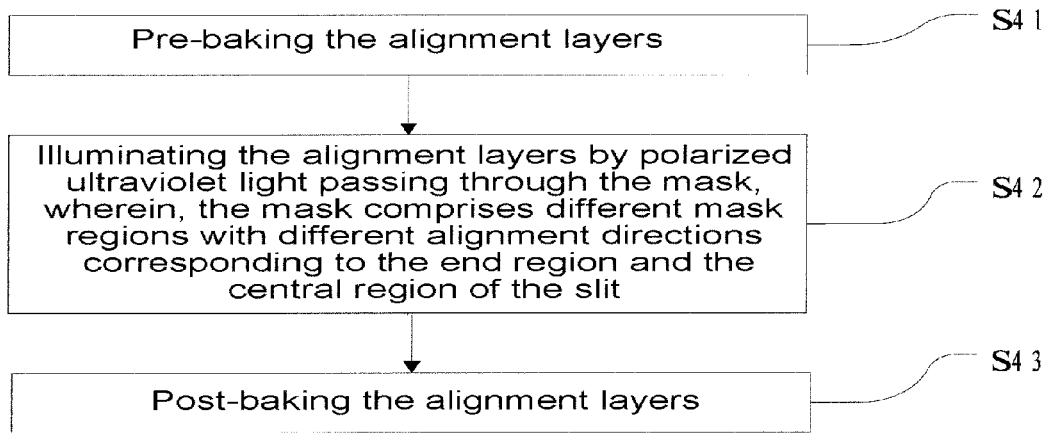
FIG. 7B is a simplified flowchart diagram showing a specific manufacturing process of the photo-alignment shown in FIG. 7A.

FIG. 7B is a simplified flowchart diagram showing a specific manufacturing process for aligning the alignment layers by the photo-alignment process, the process includes Steps S41 to S43 below.

Step S41: pre-baking the alignment layers.

Step S42: illuminating the alignment layers by polarized ultraviolet light passing through a mask, which includes different mask regions with different alignment treatment directions corresponding to the end region and the central region of the slit.

Step S43: post-baking the alignment layers.

Steps S42 and S43 can be performed simultaneously, i.e., the aligning the alignment layers by using the photo-alignment so that the alignment layers at the end region and the central region have different alignment directions can specifically include: pre-baking the alignment layers; illuminating the alignment layers by polarized ultraviolet light passing through a mask, which includes different mask regions with different alignment treatment directions corresponding to the end region and the central region of the slit, and post-baking the alignment layers simultaneously.

After the alignment layers are illuminated by the polarized ultraviolet light passing through the mask and are post-braked, the alignment layers can be further illuminated again.

In the liquid crystal display panel manufactured by the method of the present embodiment, the first electrode includes a plurality of slits, each of which has the end region and the central region adjacent to the end region, the alignment layers at the end region and the central region have different alignment directions so that the liquid crystal molecules at the end region are rotated in the predetermined direction under the effect of the electric fields. Since all of the liquid crystal molecules at the end region are rotated in the same direction, uneven display by the liquid crystal display panel is avoided and light transmittance of the display panel is improved.

The disclosure has been further illustrated in detail in combination with specific preferable embodiments as above, but specific implementations of the disclosure are not merely limited to the above illustration. For those of ordinary skills in the art, derivations or substitutions may be made further without departing from the concept of the disclosure, and all these derivations or substitutions shall fall within the protection scope of the disclosure.

What is claimed is:

1. A liquid crystal display panel, comprising:
   a first substrate and a second substrate disposed opposite to each other;
   a liquid crystal layer including a plurality of liquid crystal molecules and disposed between the first substrate and the second substrate;
   a first electrode and a second electrode both disposed on the first substrate and extend to cover most of the pixel area defined by an intersection of the data line and the gate line, so that an electric field for driving liquid crystal molecules in the liquid crystal layer to rotate is formed between the first electrode and the second electrode when a voltage is applied to the first electrode and the second electrode;
   wherein the first electrode has a plurality of slits, each of the slits has an end region and a central region adjacent to the end region, and
   the first alignment layer includes a first alignment direction of a first portion corresponding to the end region and a second alignment direction of a second portion corresponding to the central region, the first alignment direction being different from the second alignment direction,
   the second alignment layer includes a third alignment direction of a third portion corresponding to the end region and a fourth alignment direction of a fourth portion corresponding to the central region, the third alignment direction being different from the fourth alignment direction,
so that an initial alignment direction of the liquid crystal molecules corresponding to the central region is different from that of the of the liquid crystal molecules corresponding to the end region.

2. The liquid crystal display panel of claim 1, wherein,
if the liquid crystal molecules in the liquid crystal layer are positive liquid crystal molecules, under the electric field, both the liquid crystal molecules corresponding to the central region and the liquid crystal molecules corresponding to the end region rotate along a same rotation direction, and a rotation angel θ, through which the liquid crystal molecules rotate from the initial alignment direction to a final direction, satisfies the relation 0°<θ<90°; and
if the liquid crystal molecules in the liquid crystal layer are negative liquid crystal molecules, under the electric field, both the liquid crystal molecules corresponding to the central region and the liquid crystal molecules corresponding to the end region rotate along a same rotation direction, and the rotation angel θ satisfies the relation 0°<θ<90°.

3. The liquid crystal display panel of claim 2, wherein, the rotation angle θ satisfies the relation 45°<θ<90°.

4. The liquid crystal display panel of claim 2, wherein the end region comprises a first end region and a second end region respectively adjacent to two opposite ends of the central region, and the liquid crystal molecules at the first end region, the liquid crystal molecules at the second end region and the liquid crystal molecules at the central region rotate along a same direction.

5. The liquid crystal display panel of claim 1, wherein the central region comprises a first linear region and a second linear region, and the end region comprises a third end region adjacent to one end of the first linear region and a fourth end region adjacent to one end of the second linear region,
the liquid crystal molecules at the third end region and the liquid crystal molecule at the first linear region rotate along a first rotation direction, and the liquid crystal molecules at the fourth end region and the liquid crystal molecule at the second linear region rotate along a second rotation direction.

6. The liquid crystal display panel of claim 5, wherein the first rotation direction is different from the second rotation direction.

7. The liquid crystal display panel of claim 2, wherein the first electrode and the second electrode are located at different layers.

8. The liquid crystal display panel of claim 7, wherein the second electrode has a plane shape; or the second electrode has a plurality of slits, which are staggered with respect to the slits of the first electrode.

9. The liquid crystal display panel of claim 2, wherein the first electrode and the second electrode are locate at the same layer and comprise a plurality of branch electrodes, and the branch electrodes of the first electrode and the branch electrodes of the second electrode are alternately and separately arranged.

10. A method for manufacturing a liquid crystal display panel, comprising:
providing a first substrate;
forming a first electrode and a second electrode on the first substrate, the first electrode having a plurality of slits, each of the slits having an end region and a central region adjacent to the end region;
providing a second substrate;
disposing a first alignment layers on an inner surface of the first substrate and a second alignment layers on an inner surface of the second substrate;
aligning the first and second alignment layers by a photo-alignment process so that an alignment direction of a first portion, corresponding to the end region, of the first alignment layer is different from that of a second portion, corresponding to the central region, of the first alignment layer; an alignment direction of a third portion, corresponding to the end region, of the second alignment layer is different from that of a fourth portion, corresponding to the central region, of the second alignment layer;
arranging the first substrate and the second substrate together in alignment with each other; and
disposing a liquid crystal layer having a plurality of liquid crystal molecules between the first substrate and the second substrate.

11. The method of claim 10, wherein,
if the liquid crystal molecules in the liquid crystal layer are positive liquid crystal molecules, under the electric field, both the liquid crystal molecules corresponding to the central region and the liquid crystal molecules corresponding to the end region rotate in a same rotation direction, and a rotation angel θ, through which the liquid crystal molecules rotate from the initial alignment direction to a final direction, satisfies the relation 0°<θ<90°; and
if the liquid crystal molecules in the liquid crystal layer are negative liquid crystal molecules, under the electric field, both the liquid crystal molecules corresponding to the central region and the liquid crystal molecules corresponding to the end region rotate in a same rotation direction, and the rotation angel θ satisfies the relation 0°<θ<90°.

12. The method of claim 11, wherein aligning the first and second alignment layers by the photo-alignment process comprises:
pre-baking the first and second alignment layers;
providing a mask having different mask regions with different alignment treatment directions corresponding to the end region and the central region of each of the plurality of slits of the first electrode;
illuminating the first and second alignment layers by a polarized ultraviolet light passing through the mask; and
post-baking the first and second alignment layers.

13. The method of claim 11, wherein aligning the first and second alignment layers by the photo-alignment process comprises:
pre-baking the first and second alignment layers;
providing a mask having different mask regions with different alignment treatment directions corresponding to the end region and the central region of each of the plurality of slits of the first electrode; and
simultaneously illuminating the first and second alignment layers by a polarized ultraviolet light passing through the mask and post-baking the first and second alignment layers.

14. The method of claim 13, further comprising, after illuminating the first and second alignment layers by the polarized ultraviolet light passing through the mask and post-braking the alignment layers, illuminating the first and second alignment layers again.

* * * * *